US012543856B2

(12) United States Patent
Shatara et al.

(10) Patent No.: US 12,543,856 B2
(45) Date of Patent: Feb. 10, 2026

(54) STORAGE APPARATUS

(71) Applicant: NewAge Products Inc., Toronto (CA)

(72) Inventors: Margaret Shatara, Toronto (CA); Wing Hong (Aaron) Ma, Richmond Hill (CA)

(73) Assignee: NewAge Products Inc., Toronto (CA)

( * ) Notice: Subject to any disclaimer, the term of this patent is extended or adjusted under 35 U.S.C. 154(b) by 232 days.

(21) Appl. No.: 18/452,656

(22) Filed: Aug. 21, 2023

(65) Prior Publication Data

US 2025/0064210 A1    Feb. 27, 2025

(51) Int. Cl.
*A47B 96/00*    (2006.01)
*A47B 57/56*    (2006.01)
*A47B 96/02*    (2006.01)

(52) U.S. Cl.
CPC .......... *A47B 96/028* (2013.01); *A47B 57/565* (2013.01)

(58) Field of Classification Search
CPC ..... A47B 96/028; A47B 96/063; A47B 96/06; A47B 96/021; A47B 96/02; A47B 57/565; A47B 43/006; A47B 55/02; A47B 95/008; A47F 5/0892; A47F 5/01
USPC .......................... 108/108, 42, 137, 149, 152; 312/245–248; 211/113
See application file for complete search history.

(56) References Cited

U.S. PATENT DOCUMENTS

| | | | | |
|---|---|---|---|---|
| 2,788,219 A | * | 4/1957 | Mcclellan | B60B 33/06 280/43.15 |
| 3,791,709 A | * | 2/1974 | Cross | A47B 95/008 248/300 |
| 4,010,916 A | * | 3/1977 | Swain | B66D 1/38 242/157.1 |
| 4,932,740 A | | 6/1990 | Berkey et al. | |

(Continued)

FOREIGN PATENT DOCUMENTS

| | | |
|---|---|---|
| CN | 101387723 A | 3/2009 |
| CN | 110456464 A | 11/2019 |

(Continued)

OTHER PUBLICATIONS

English language abstract for CN 101387723 A extracted from espacenet.com database on Sep. 14, 2023, 1 page.

(Continued)

*Primary Examiner* — Janet M Wilkens
(74) *Attorney, Agent, or Firm* — Howard & Howard Attorneys PLLC

(57) ABSTRACT

A storage apparatus attachable to a surface of a structure includes a mounting bracket configured for reversible attachment of the storage apparatus to the structure at a desired height, at least a pair of support beams reversibly secured to the mounting bracket, at least one additional support cross beams reversibly secured to the mounting bracket and spaced between the pair of support beams. The storage apparatus also includes a cable system respectively secured to the support beams and to the structure that are (Continued)

used in conjunction with an alignment device and an incremental adjustment device to support and level the storage apparatus, a front support beam, and one or more storage racks seated onto the back bracket assembly, support beams, cross beams and front support beam. The length of the mounting bracket may also be adjusted for attaching to the surface.

23 Claims, 25 Drawing Sheets

(56) References Cited

U.S. PATENT DOCUMENTS

| | | | |
|---|---|---|---|
| 5,926,594 A | 7/1999 | Song et al. | |
| 6,744,939 B2 | 6/2004 | Lampert et al. | |
| 6,870,628 B2 | 3/2005 | Healy et al. | |
| 7,577,330 B2 | 8/2009 | Beshears et al. | |
| 7,654,495 B2* | 2/2010 | Adrian | H02G 3/20 248/200.1 |
| 8,132,971 B2 | 3/2012 | Luther et al. | |
| 8,457,461 B2 | 6/2013 | Ott | |
| 8,740,474 B2 | 6/2014 | Lu | |
| 9,885,843 B2 | 2/2018 | Bhagavatula et al. | |
| 10,330,875 B2 | 6/2019 | Fini et al. | |
| 10,401,568 B2 | 9/2019 | Lu | |
| 10,739,169 B2 | 8/2020 | Pacini et al. | |
| 10,788,627 B2 | 9/2020 | Bhagavatula et al. | |
| 10,838,140 B2 | 11/2020 | Li et al. | |
| 10,845,555 B2 | 11/2020 | Fini et al. | |
| 10,897,992 B2* | 1/2021 | Vandenham | A47B 43/006 |
| 11,256,039 B2 | 2/2022 | Carberry et al. | |
| 2005/0129371 A1 | 6/2005 | Massey | |
| 2010/0080511 A1 | 4/2010 | Luther et al. | |
| 2011/0097048 A1 | 4/2011 | Olsen | |
| 2012/0045169 A1 | 2/2012 | Hu et al. | |
| 2016/0033720 A1 | 2/2016 | DiGiovanni | |
| 2020/0077791 A1* | 3/2020 | Vandenham | A47B 43/006 |
| 2021/0286140 A1 | 9/2021 | Winzer | |
| 2021/0294044 A1 | 9/2021 | Haag et al. | |
| 2022/0004566 A1 | 1/2022 | Lu et al. | |
| 2022/0133038 A1* | 5/2022 | Sytsma | A47B 96/02 211/113 |
| 2022/0350080 A1 | 11/2022 | Lawson et al. | |
| 2024/0416169 A1* | 12/2024 | Decker | A63B 21/156 |

FOREIGN PATENT DOCUMENTS

| | | |
|---|---|---|
| EP | 0778957 B1 | 11/2001 |
| JP | 2013171208 A | 9/2013 |
| RU | 2428965 C1 * | 9/2011 |
| WO | 2002101439 A1 | 12/2002 |

OTHER PUBLICATIONS

English language abstract for CN 110456464 A extracted from espacenet.com database on Sep. 14, 2023, 1 page.

English language abstract for JP 2013-171208 A extracted from espacenet.com database on Sep. 14, 2023, 1 page.

* cited by examiner

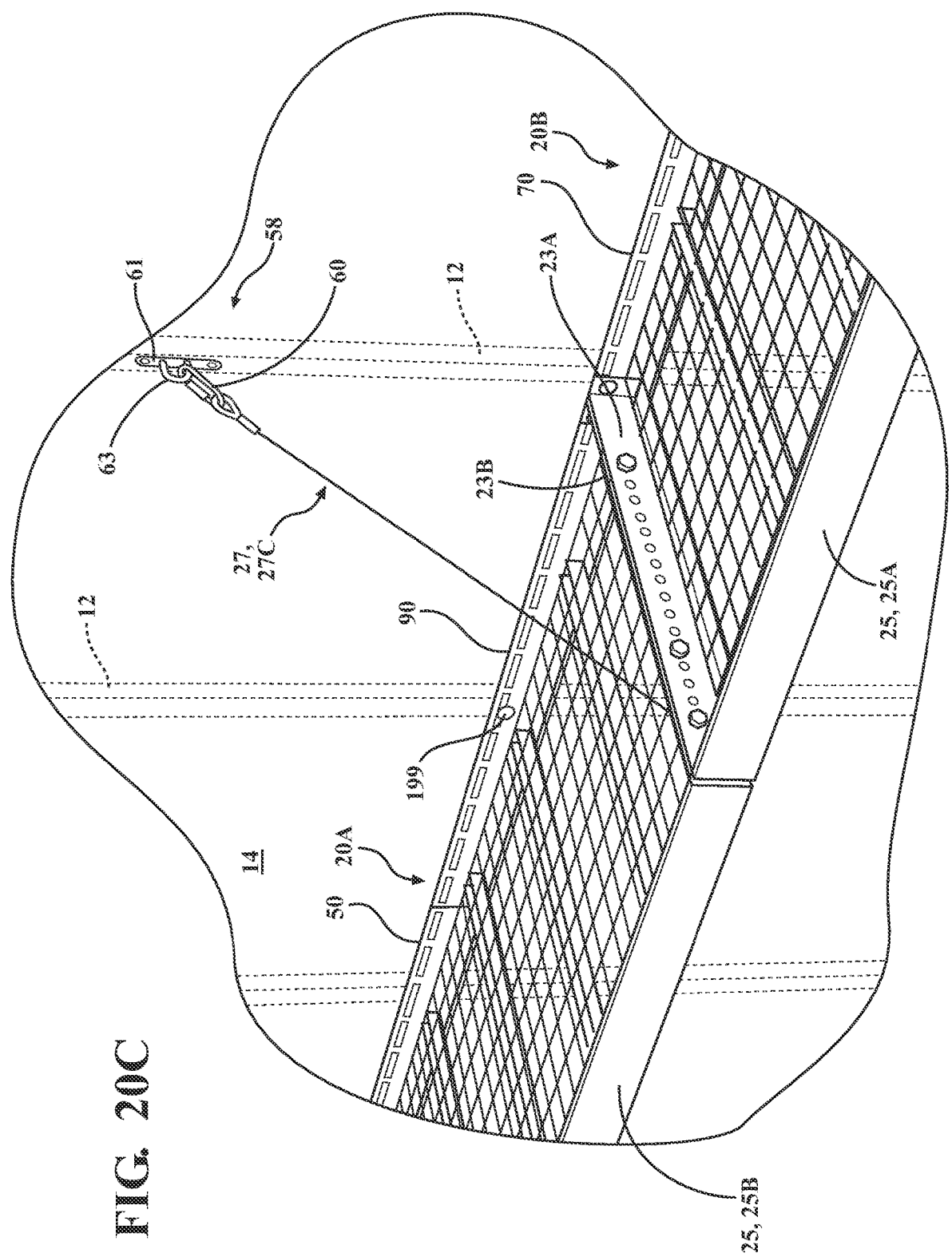

STORAGE APPARATUS

FIELD OF THE DISCLOSURE

The present disclosure relates generally to storage apparatus attachable to a surface.

BACKGROUND

Storage apparatuses are often used in residential and/or commercial properties for storing items. Some storage apparatuses may be attachable to a surface, such as to a side wall or ceiling of building structure, and one or more items may be placed or stacked on the apparatus when attached to the surface. In some instances, it may be desirable to adjust a height of the apparatus relative to the surface. However, with some designs, height adjustment may be limited and/or cumbersome for the user. The present disclosure is aimed at solving the challenge(s) presented above.

SUMMARY

A storage apparatus attachable to a surface of a structure is disclosed herein that includes a mounting bracket for attachment to the surface at a desired height relative to the structure. The apparatus also includes a plurality of support beams interconnected together and coupled to the mounting bracket to form a support frame with the plurality of support beams including a first support beam having first and second beam ends, with first support beam defining a plurality of mounting positions between the first and second beam ends. The length of the mounting bracket can be adjusted for mounting to the surface of the structure to a desired length. The storage apparatus also includes a support structure abutting and being at least partially supported by the support frame and an alignment device attached to the first support beam through at least one of the plurality of mounting positions. The storage apparatus also includes a cable extending between a first cable end and a second cable end with the first cable end adapted to be attached to the surface and with the second cable end coupled to the alignment device, the cable movable relative to the alignment device to adjust the support structure and the support frame relative to the mounting bracket. Also, the storage apparatus includes an incremental adjustment device coupled to one of the alignment device and the cable to further move the cable relative to the alignment device to further adjust the support structure and the support frame relative to the mounting bracket.

In certain embodiments, the support structure includes one or more storage racks that are each configured to be seated onto the mounting, the front support beam, the support beams and one or more of the additional support cross beams and are used to store items or articles thereupon.

The storage apparatus of the subject application is configured for reversible attachment to a support structure such as a wall or ceiling and in particular to a stud contained within the wall. The cable systems, the alignment device and the incremental adjustment device allow the support structure to be easily positioned at the desired height and subsequently leveled at the desired height relative to the floor or to the support structure during installation. In addition, the mounting bracket is easily adjustable so that it can be securely mounted to the studs contained within a support structure even where the pair of support beams are not aligned along a respective stud within the structure.

BRIEF DESCRIPTION OF THE DRAWINGS

Advantages of the present disclosure will be readily appreciated as the same becomes better understood by reference to the following detailed description when considered in connection with the accompanying drawings.

FIG. 3A is a side section view of a portion of FIG. 3 illustrating a fastening device used to secure a bracket to a side rail.

FIG. 20C is a close-up semi-schematic second side perspective view of the connection region in FIG. 20A.

DETAILED DESCRIPTION

Figure 1:
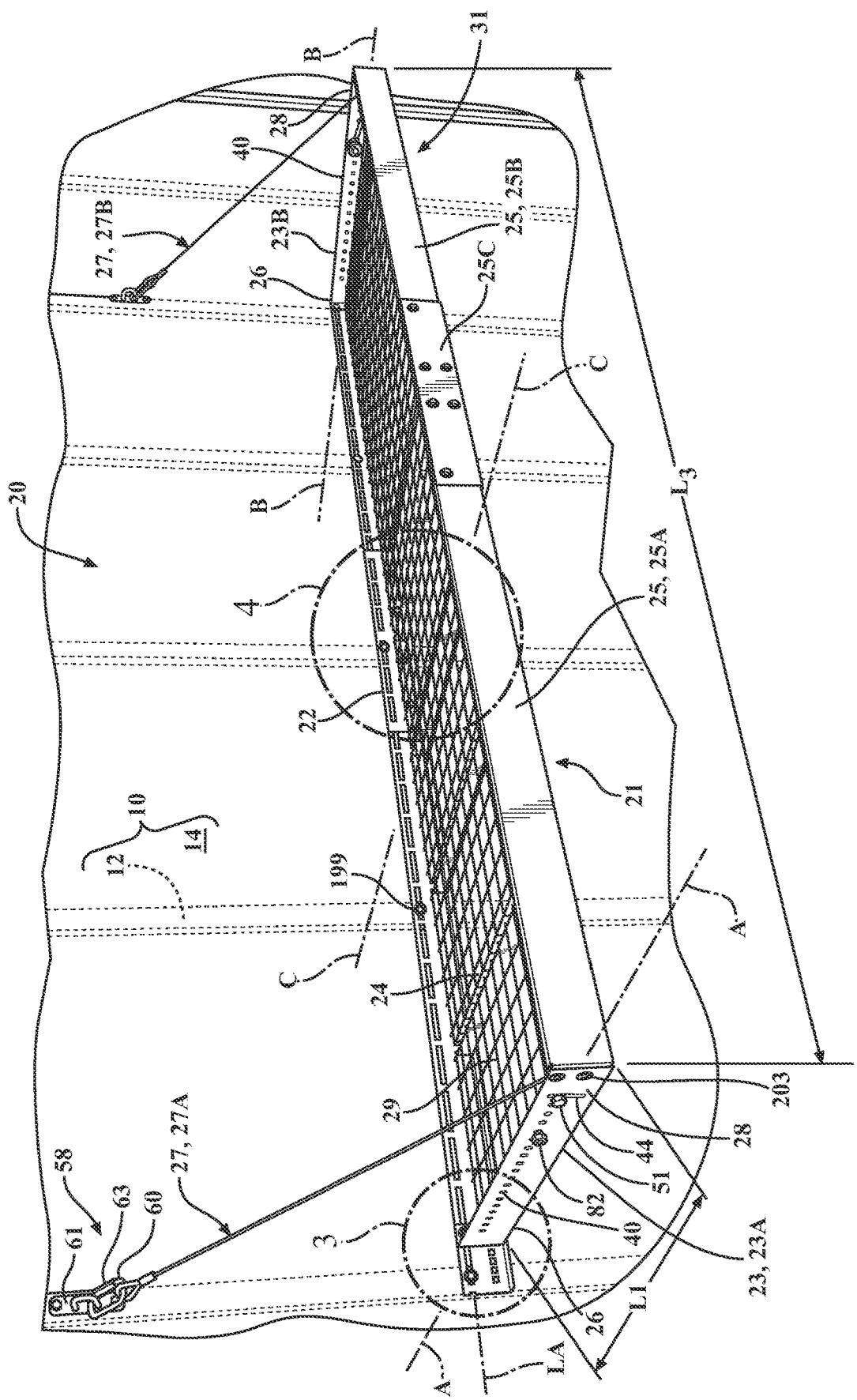
FIG. 1 is a semi-schematic perspective view of an embodiment of a storage apparatus attached to a structure.

Referring now to the figures, wherein like numerals indicate corresponding parts throughout the several views, embodiments of a storage apparatus 20 are shown throughout the figures and described in detail below. The storage apparatus 20 is attachable to a structure 10, such as a ceiling, a wall, a door, a tangible or intangible object, etc. In certain embodiments, the storage apparatus 20 is attachable to the studs (shown in phantom as 12, which alternatively may be referred to as back beams 12) contained within a vertically extending wall 14, such as a wall 14 of a commercial or residential building or structure, such as shown for example in FIGS. 1 and 15. In certain embodiments, the storage apparatus 20 may also be attachable to a ceiling 16 of a commercial or residential building or structure, such as shown for example in FIG. 13. The storage apparatus 20 may also be attachable to a surface located inside or outside of the building or structure. For instance, the storage apparatus 20 may be attachable to an interior wall or ceiling of a residential building (such as an interior wall or ceiling of a garage), an exterior wall of the residential building, etc.

The storage apparatus 20 is configured to hold, support, and/or store at least one item. For residential purposes, and as non-limiting examples, the storage apparatus 20 may be configured to hold, support, and/or store household cleaning items, food items, garage items, tools, yard equipment, sporting equipment, clothing, pet supplies, etc. For commercial purposes, and as non-limiting examples, the storage apparatus 20 may be configured to hold, support, and/or store commercial products or stock, packaging, office supplies, office equipment, cleaning supplies, tools, etc. It should be appreciated that the storage apparatus 20 can be configured to hold, support, and/or store any type of item or plurality of items having any configuration. It should also be appreciated that the storage apparatus 20 can be configured to hold, support, and/or store the item(s) having any reasonable weight.

The storage apparatus 20 includes a support structure 21, such as at least one storage rack or one or more storage racks (shown in the figures as reference numeral 29 and sometimes simply referred to as a rack 29 or racks 29) or a support panel (not shown) that is adapted to hold and/or support the at least one item or article. For example, the item(s) or article(s) may be placed on the support structure 21 for storage, safe keeping, or the like. The support structure 21 is adjustable relative to the structure 10 in the illustrated embodiments.

Embodiments of the storage apparatus 20 or components of the storage apparatus 20, and the adjustments thereto in terms of height and/or width of the support structure 21, are described below with reference to one embodiment in FIGS. 1-9 and 11-12, and separately and relatedly described in other exemplary embodiments in FIGS. 13-14 and FIG. 15-20. It should be appreciated that various features of the embodiments of the storage apparatus 20 may be generically or schematically illustrated in one or more of the figures of either or both embodiments. Additionally, the embodiments of the storage apparatus 20 shown throughout the figures are merely illustrative and are not necessarily drawn to scale. Still further, the common features in each of the embodiments are described with the same reference numbers unless otherwise indicated.

With reference to the figures, the storage apparatus 20 includes, as its major components in each of the exemplary embodiments illustrated, a mounting bracket 22 (sometimes alternatively referred to as a back bracket assembly 22) configured for reversible attachment of the storage apparatus 20 to the structure 10 at a desired height relative to the structure and extending in length along a longitudinal axis LA, and at least a pair of support beams 23 reversibly secured to the mounting bracket 22 and extending transverse to the length of the back bracket assembly. The storage apparatus 20 also includes at least one additional support cross beam 24 reversibly secured to the mounting bracket 22 spaced between the pair of support beams 23 and extending transverse to the mounting bracket 22, and at least a pair of cable systems 27 respectively secured to the support beams 23 and to the structure 10 that are used to support the storage apparatus 20 (and support structure 21) and which is used in conjunction with at least one alignment device (alignment device 48 illustrated in FIGS. 1-9 and 11-14 or alternatively alignment device 148 illustrated in FIGS. 15-20) by a user to level the storage apparatus 20 (as will also be described further below). Even still further, the storage apparatus 20 also includes a front support beam 25 that is spaced from the mounting bracket 22 with the length of the front support beam 25 extending transverse to each of the support beams 23 and support cross beams 24 along the longitudinal axis LA. Yet still further, in certain embodiments, the support structure 21 includes one or more storage racks 29 that are each configured to be seated onto the mounting bracket 22, the front support beam 25, the support beams 23 and the one or more of the additional support cross beams 24 and are used to store items or articles thereupon. The support beams 23, 25 are interconnected together and coupled to the mounting bracket 22 to form a support frame 31.

The mounting bracket 22 includes a pair of side rails 70, 90 coupled together and, in certain embodiments, also includes a middle rail 50 coupled to and between each of the pair of side rails 70, 90 for extending the length of the pair of side rails 70, 90. More in particular, each of the side rails 70, 90 and optionally the middle rail 50 are slidingly coupled together so as to adjust the length of the overall mounting bracket 22 and to adjust the positioning of the side rails 70, 90 and optionally middle rail 50 such that each of the side rails 70, 90 and optionally middle rail 50 can be positioned such that the they are fastened to a respective stud 12 or otherwise be positioned at a desired length along the wall 14 of the structure 10, as will be described further below.

Figure 13:
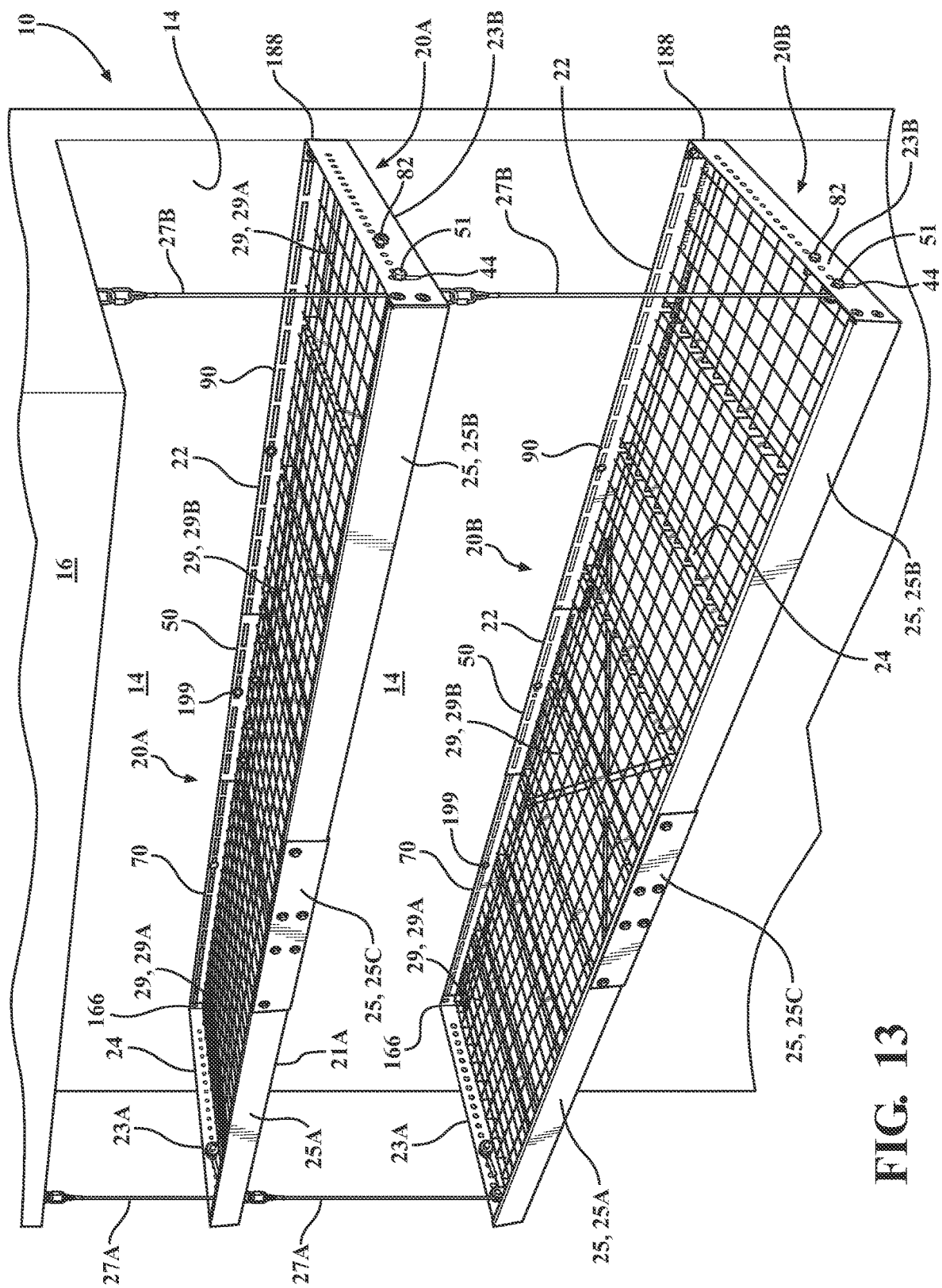
FIG. 13 is an alternative embodiment including a pair of storage apparatus attached to a wall of a structure with the top one of the pair also adjustably attached to a ceiling of the structure via a first cable system and with the bottom one of the pair coupled to the top one of the pair via a second cable system.
Figure 15:
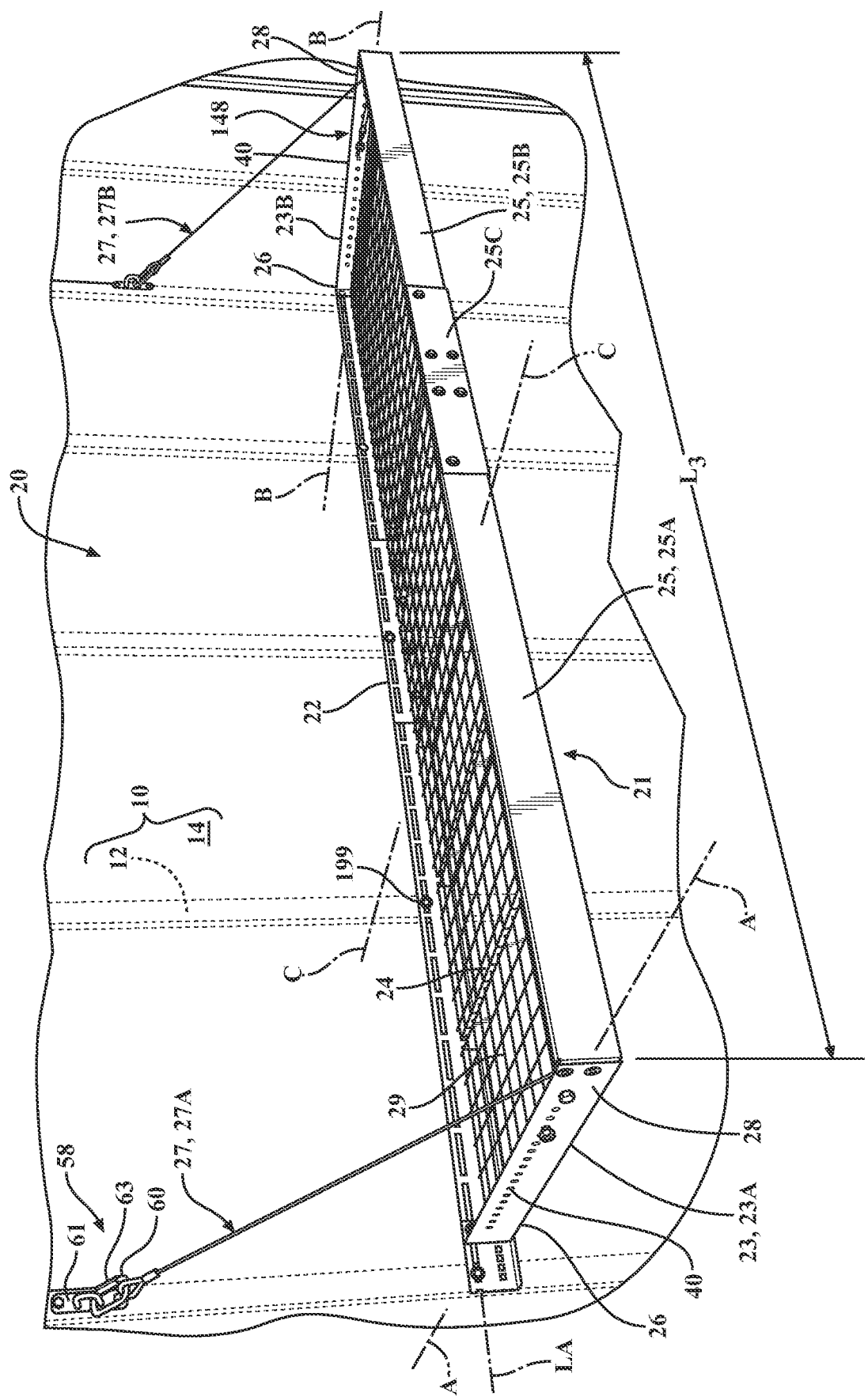
FIG. 15 is a semi-schematic perspective view of another alternative embodiment of a storage apparatus attached to a structure.
Figure 16:
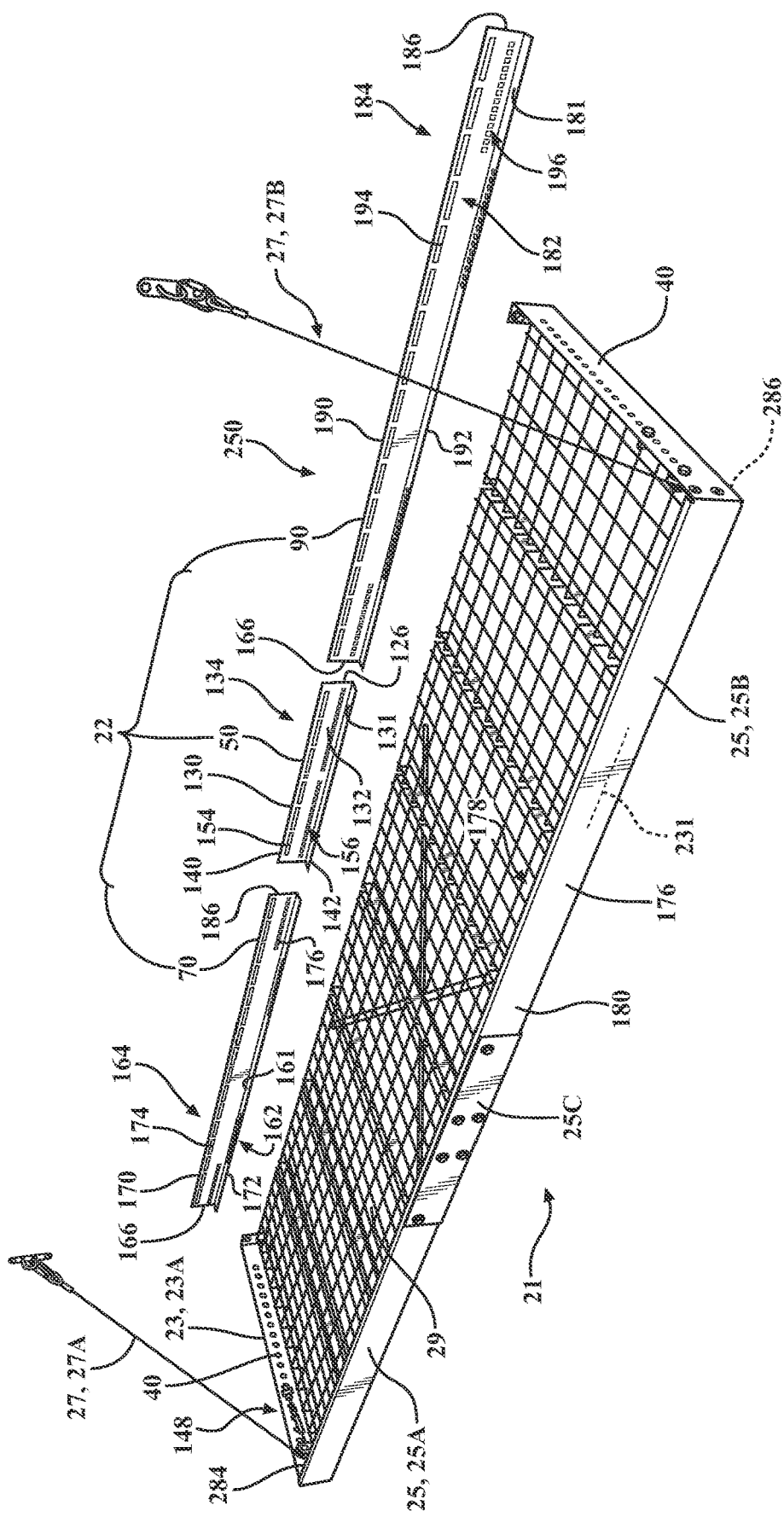
FIG. 16 is a top semi-schematic perspective view of a portion of the support structure of FIG. 15.

In the embodiments as illustrated in FIGS. 1, 13 and 15, a pair of support beams 23 is further defined as a first support beam 23A defining a first beam axis A and having a length $L_1$ (see FIG. 1) extending between the first and second beam ends 26, 28 along the beam axis A and a second support beam 23B spaced longitudinally from the first support beam 23A and having a length $L_2$ (see FIG. 2) extending between the first and second beam ends 26, 28 along a second beam axis B, with the first beam axis A extending parallel to the second beam axis B. The first support beam 23A is positioned near one end 166 (i.e., a first bracket end 166) of the mounting bracket 22 and one end of the front support beam 25 along the longitudinal axis LA, while the second support beam 23B is positioned near a second end 186 of the mounting bracket 22 (i.e., a second bracket end 186) and second end of the front support beam 25 opposite the first end along the longitudinal axis LA. The longitudinal axis LA rans transverse, and preferably perpendicular, to beam axis A and beam axis B.

Figure 2:
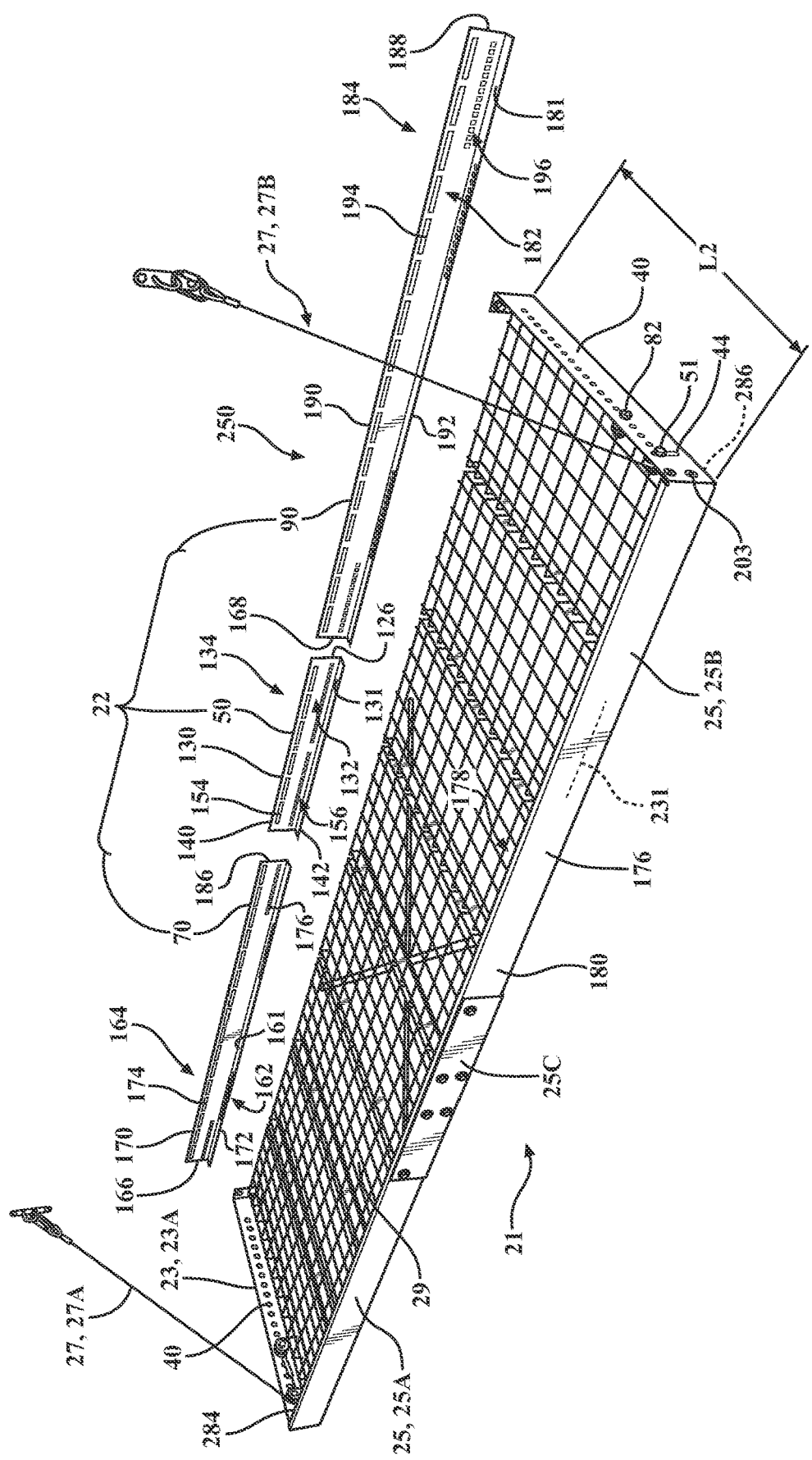
FIG. 2 is a partially exploded view of the storage apparatus of FIG. 1 prior to attachment to the structure.
Figure 3:
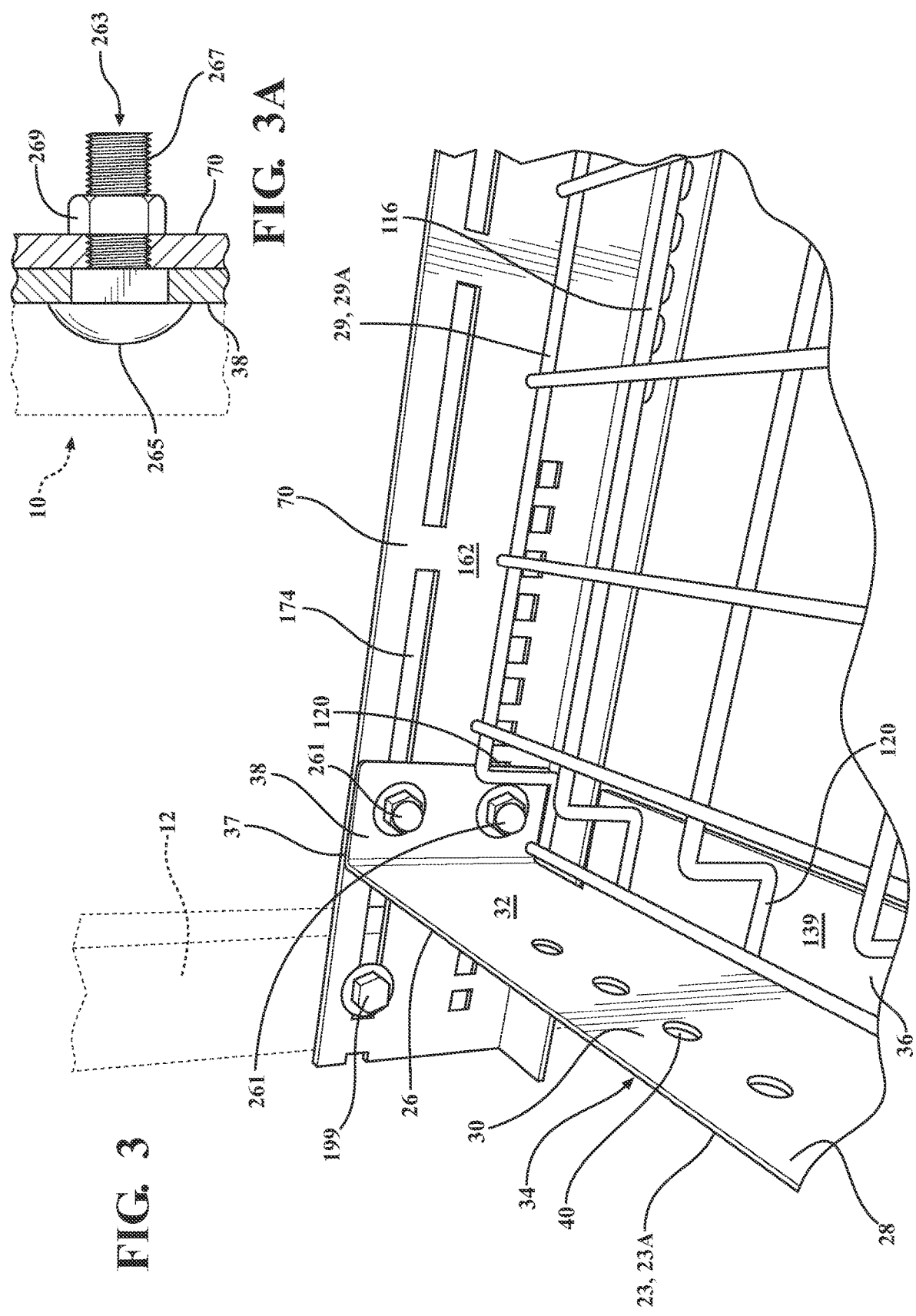
FIG. 3 is a close-up view of a portion of FIG. 1 taken within circle 3 of FIG. 1.
Figure 4:
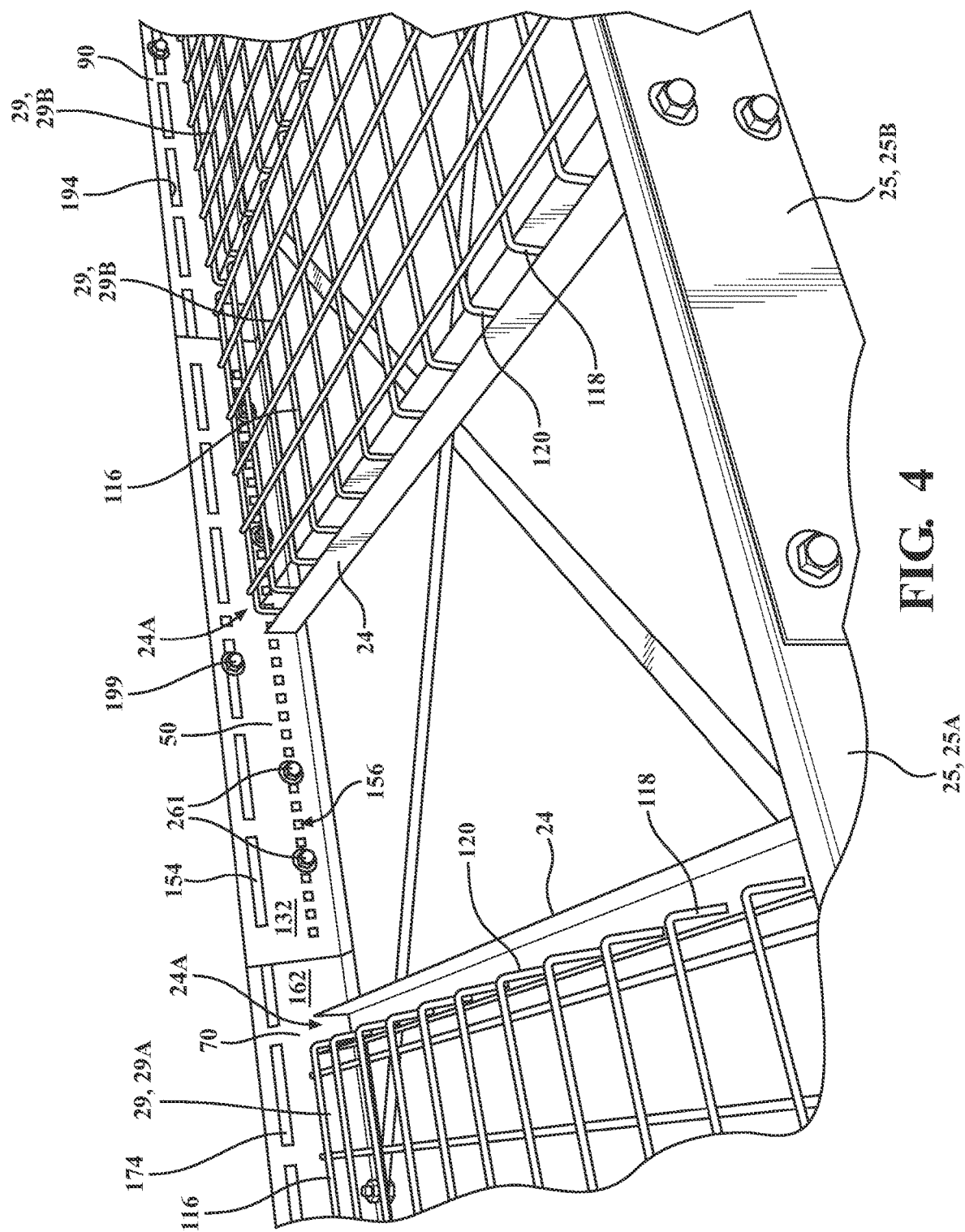
FIG. 4 is a close-up view of a portion of FIG. 1 taken within circle 4 of FIG. 1 and with one of the middle support racks removed.

As also shown in FIGS. 1-6, the storage apparatus 20 also includes a plurality of additional support cross beams 24 coupled to the one of the side rails 70, 90 or to the middle rail 50 (if present) of the mounting bracket 22 and to the front support beam 25 that are positioned between the first support beam 23A and the second support beam 23B. Preferably, the inner ends of the additional support cross beams 24 are fastened to the one of the side rails 70, 90 or to the middle rail 50 (if present) of the mounting bracket 22 by inserting a fastener (not shown) through the cross beam 24 and through a respective aperture 176, 196, 156 of a corresponding one of the side rails 70, 90 or middle rail 50 (apertures 176, 156 and 196 are shown in FIGS. 2-4). The length of the additional support cross beams 24 defines beam axis C that is preferably parallel or generally parallel to each of the beam axis A and B defined by the lengths of the first and second support beams 23A, 23B. Still further, in certain embodiments, the top of the additional cross beams 24 may be channeled, i.e., respectively include a channel 24A (best shown in FIG. 3), that is configured to receive a lip 118 of an adjacent pair of storage racks 29. The term "generally parallel", as described herein, refers to wherein an angle defined between an imaginary axis defined by the length of the first and second cross beams 23A, 23B intersect and define an imaginary angle of 5 degrees or less therebetween.

Referring now to FIG. 3, each of the first support beam 23A and the second support beam 23B (the first support beam 23A is shown in FIG. 3) further has a body 30 with inner side 32 and outer side 34 and a ledge 36 extending inwardly from the inner side 32 of the bottom side 35 of the body 30. The ledge 36 defines one or more openings 36A extending between a lower side 39 and an opposing upper side 139. Additionally, each of the first support beam 23A and second support beam 23B has a top surface 37 and a flange 38 extending inwardly at the first beam end 26. The first support beam 23A and second support beam 23B may each be formed of any suitable material, such as a metal, a metal alloy, a polymer or plastic, a natural material (e.g., wood), a synthetic material, and/or the like, and/or combinations thereof.

Figure 5:
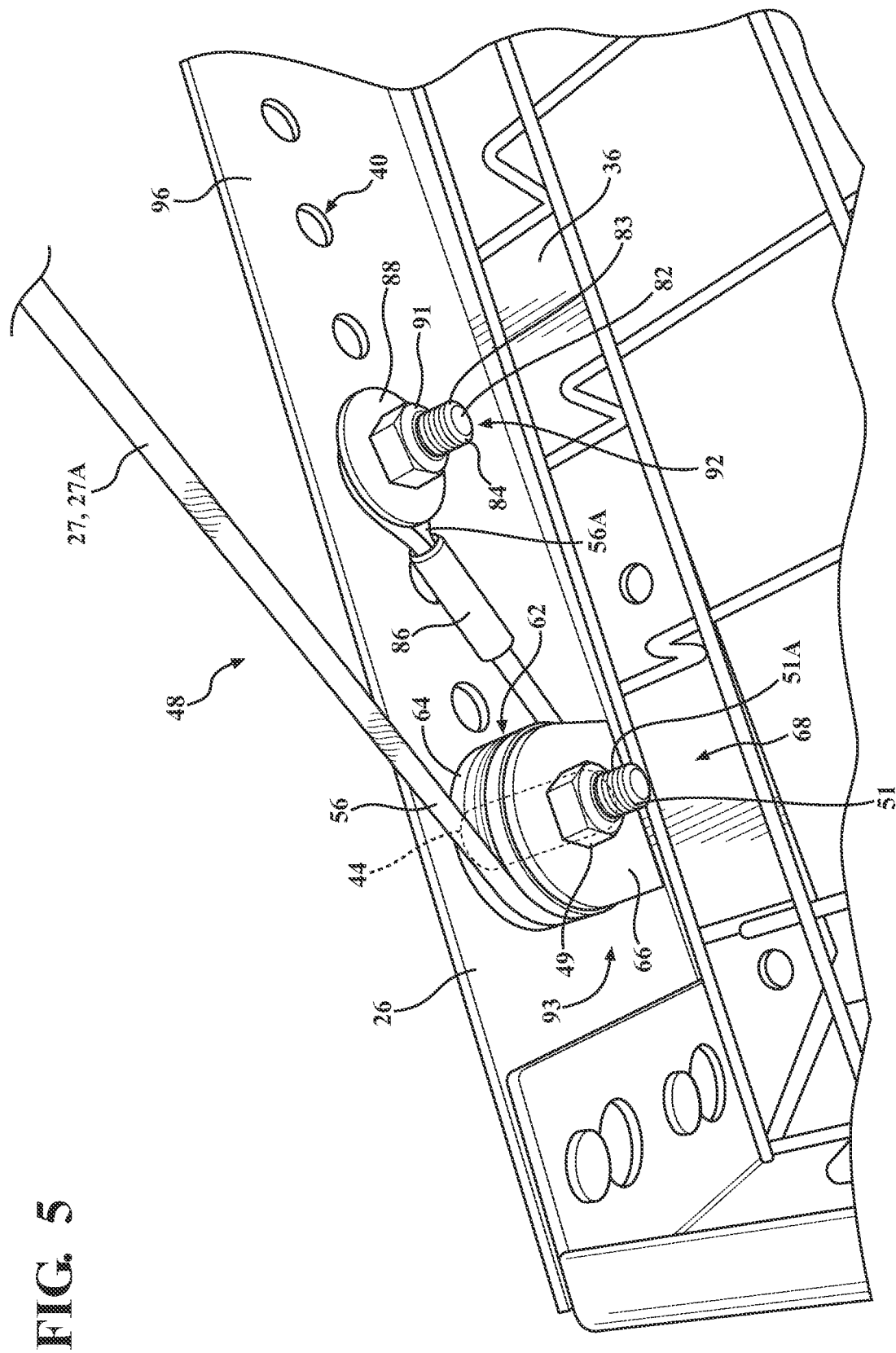
FIG. 5 is a top semi-schematic perspective view of a portion of the support structure of FIG. 1.
Figure 6:
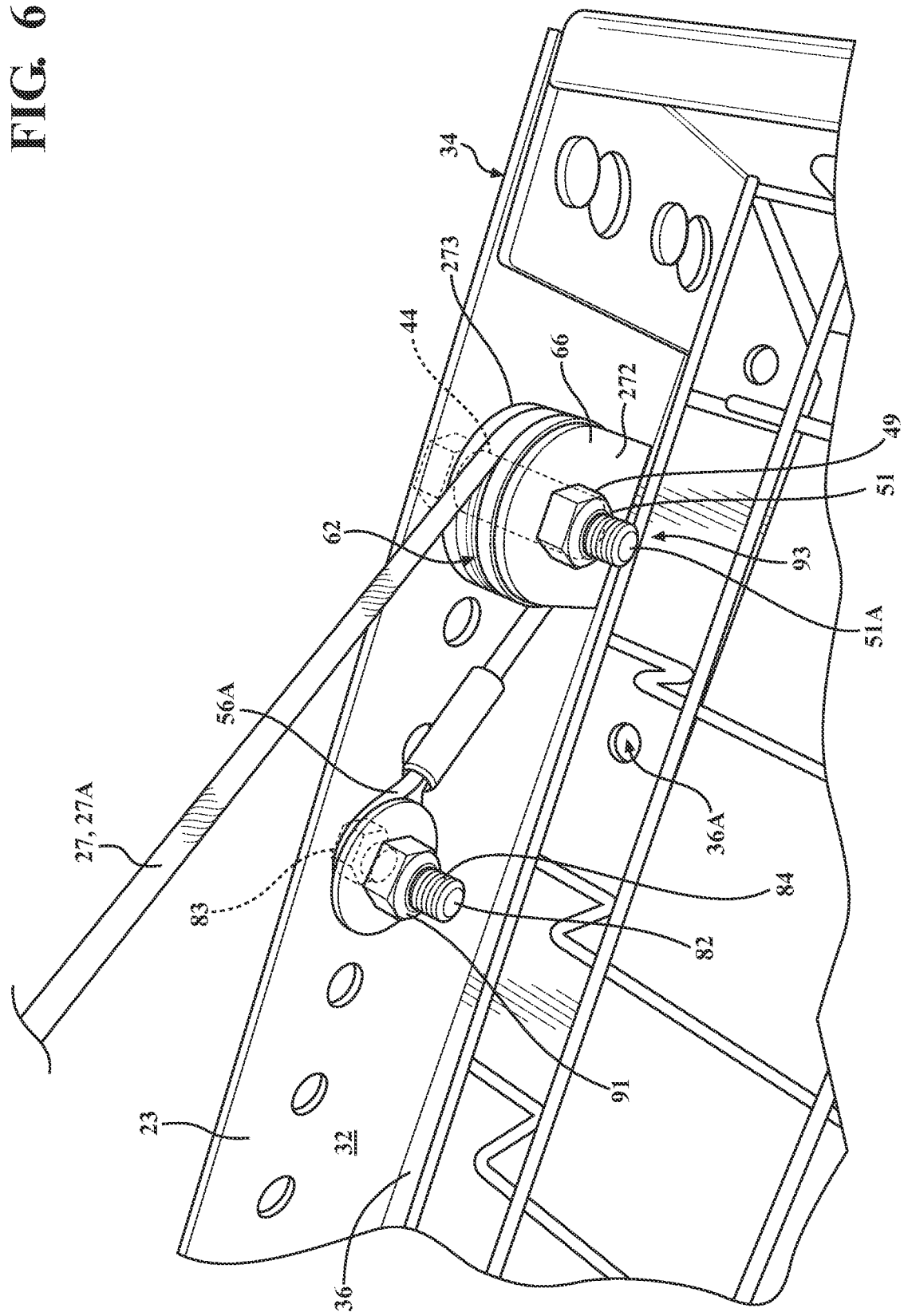
FIG. 6 is another top semi-schematic perspective view of another portion of the support structure of FIG. 1.

As best shown in FIGS. 1-3, each of the first support beam 23A and second support beam 23B defines a respective first plurality of mounting positions 40 between the first and second beam ends 26, 28. In the illustrated embodiments, the plurality of mounting positions 40 of the respective first support beam 23A and second support beam 23B may be further defined as a first plurality of apertures 40 extending between the inner side 32 and outer side 34 which are positioned above the ledge 36 (i.e., the first and second support beams 23A, 23B define a plurality of apertures 40, as best shown in FIGS. 3, 5, and 6). Each one of the first plurality of apertures 40 of the respective first support beam 23A and second support beam 23B is separated (i.e., spaced) from an adjacent one of the first plurality of apertures 40 of the respective first support beam 23A and second support beam 23B. In an embodiment, each one of the first plurality of apertures 40 of the respective first support beam 23A and second support beam 23B is evenly spaced from an adjacent one of the first plurality of apertures 40 of the respective first support beam 23A and second support beam 23B. As shown, each of the first plurality of apertures 40 of the respective first support beam 23A and second support beam 23B has a circular configuration. It should be appreciated that the first plurality of apertures 40 of the respective first support beam 23A and second support beam 23B can have any suitable configuration other than circular, such as a polygonal shape or oval shape.

Each one of the first plurality of apertures 40 of each of the first support beam 23A and second support beam 23B, when used in conjunction with a corresponding respective one of the pair of cable systems 27, corresponds to a particular height of the support structure 21 relative to the reference position on the structure 10 or the structure 10 itself. In particular, during assembly of the storage apparatus 20, the user selects one of the apertures 40 on each of the first and second support beams 23A, 23B through which the respective one of cable systems 27 is attached to the respective support beam 23A, 23B, with the selected aperture 40 corresponding to a desired height of the support structure 21, and with the selection of the one aperture 40 spaced inwardly from the second beam end 28 of the respective first support beam 23A and second support beam 23B. To raise the height of the support structure 21, the user selects another one of the first plurality of apertures 40 through which to attach a respective one of the cable systems 27 on a respective one of the first and second support beams 23A, 23B that is spaced further inwardly relative to the second beam end 28 of the respective first support beam 23A and second support beam 23B (i.e., in a direction closer to the first beam end 26) as compared with the originally selected one aperture 40 of the respective first support beam 23A and second support beam 23B. Similarly, to lower the height of the support structure 21, the user selects another one of the first plurality of apertures 40 of the respective first support beam 23A and second support beam 23B that is spaced further outwardly relative to the second beam end 28 of the first support beam 23A and second support beam 23B (i.e., in a direction further from the first beam end 26) as compared with the originally selected one aperture 40 of the respective first support beam 23A and second support beam 23B to attach the respective cable system 27. It should be appreciated that the user can select any one aperture 40 on each of the first and second support beams 23A, 23B while selecting the desired height of the support structure 21 relative to the structure 10.

With reference to FIGS. 1, 2, 5-7, 11, 12C, 13 and 14, the first support beam 23A (and second support beam 23B) further defines a vertical slotted opening 44 (i.e., a vertical slot 44 or slot 44) proximate to the second beam end 28. The vertical slotted opening 44 may have any suitable configuration, such as in the shape of a rectangle, and is configured to receive a bolt 51 of a fastening system 68 for securing the alignment device 48 to the first support beam 23A at a desired height as described below. The vertical slotted opening 44 is aligned with the plurality of apertures 40 and is adjacent to the aperture 40 closest to the second beam end 28 (with the vertical slotted opening 44 between the last aperture 40 and the second beam end 28). As used herein, the term "vertical" in the phrase "vertical slotted opening" or "vertical slot" is not meant to suggest that the slotted opening 44 or slot 44 is vertical relative to the floor. but is instead vertical or normal with respect to a plane defined along the bottom side of the support beam 23A, 23B regardless of the orientation of the support beam 23A, 23B relative to the floor.

The storage apparatus 20 further includes the alignment device 48 attached to the first support beam 23A. The alignment device 48 may be attached anywhere along the length $L_1$ of the first support beam 23A. In an embodiment, the alignment device 48 is attached proximate the second beam end 28 of the first support beam 23A. Additionally, the alignment device 48 is disposed adjacent the inner side 32 of the first support beam 23A. Further details of the alignment device 48 are described below.

In certain embodiments, the at least a pair of cable systems 27 is further defined as a first cable system 27A and a second cable system 27B, with the first cable system 27A associated with the first support beam 23A and the second cable system associated with the second support beam 23B.

Each of the first and second cable systems 27A and 27B include a cable 52 having a first cable end 54 and second cable end 56. The first cable end 54 is adapted to be attached to the structure 10 (see for example in FIG. 1). The first cable end 54 may be attached to the structure 10 utilizing a suitable fastening system 58. In the embodiment shown in FIG. 1, the fastening system 58 includes a turnbuckle 60 secured to an eyelet 63 of a bracket 61, with the bracket 61 secured to the structure 10, here the stud 12, using one or more fastening devices such as screws or nails.

The second cable end 56 is removably attached to the first support beam 23A at a selected one of the first plurality of mounting positions 40. The cable 52 is coupled to the alignment device 48 to align the second cable end 56 with the first support beam 23A and the selected one of the first plurality of mounting positions 40. An incremental adjustment device 93 is also coupled to the alignment device 48 and is mounted to the first support beam 23A and is used make minor adjustments to level the first support beam 23A, preferably to a desired horizontal orientation parallel to the floor, after the support structure 21 is installed.

As shown at least in FIGS. 5 and 6, the alignment device 48 includes a groove 62 with the cable 52 seated within the groove 62. The groove 62 can have any suitable configuration and/or take on any suitable form. In the illustrated embodiment, the alignment device 48 includes a pulley 64, and the pulley 64 defines the groove 62. The pulley 64 is fixed to the first support beam 23A at a position corresponding to the vertical slotted opening 44 utilizing the fastening system 68 described in further detail below, such that the pulley 64 does not rotate relative to the first support beam 23A.

Figure 7:
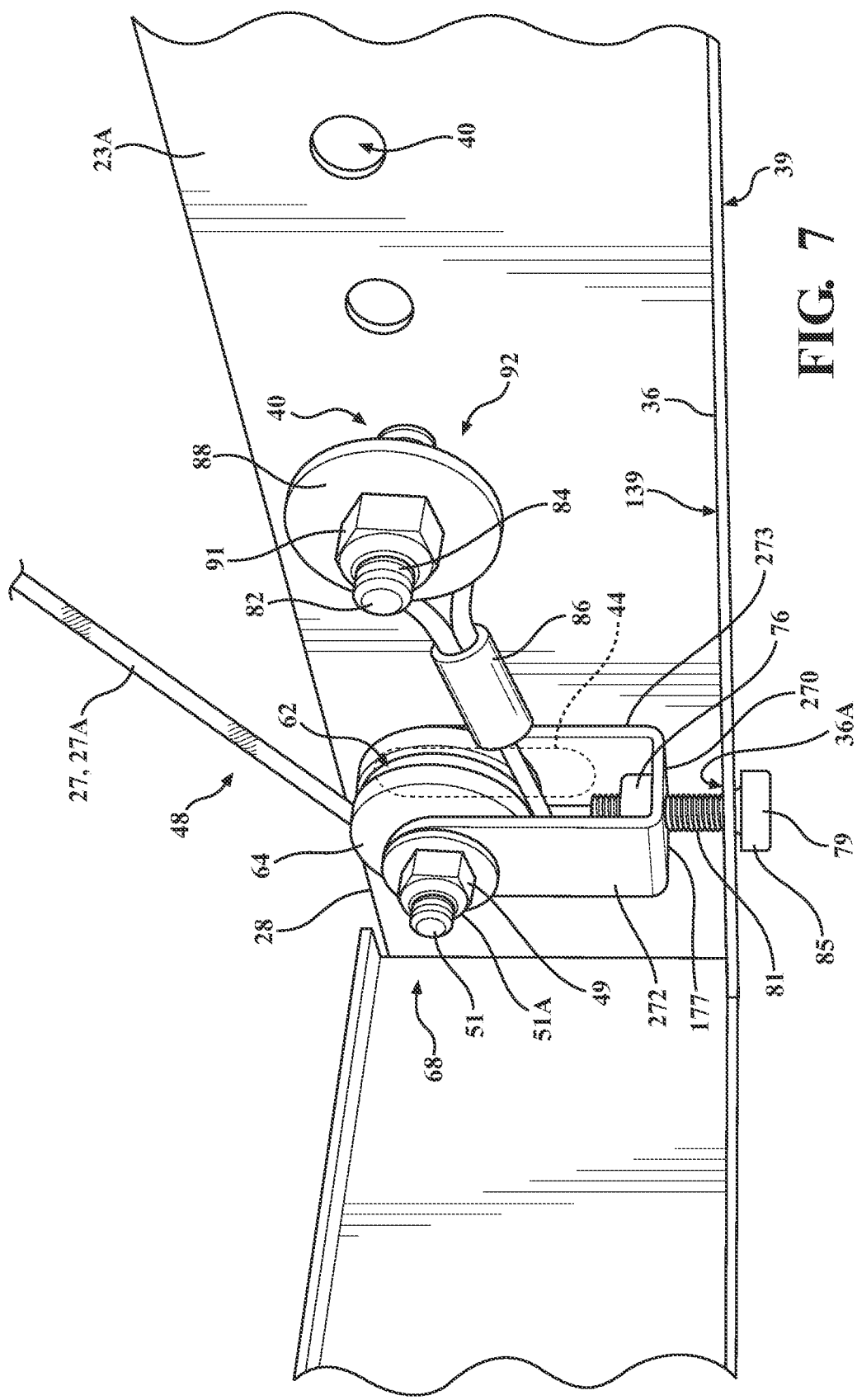
FIG. 7 is a semi-schematic perspective view of a portion of the support structure of FIG. 1.
Figure 9:
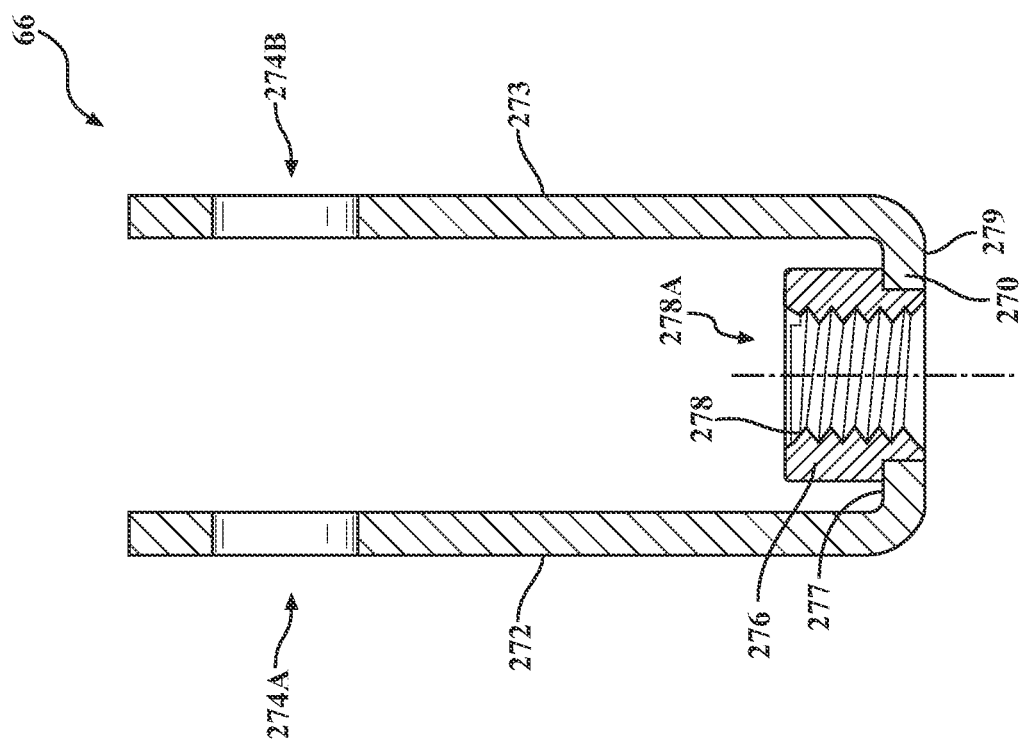
FIG. 9 is a side section view of the u-shaped bracket of FIG. 8.
Figure 8:
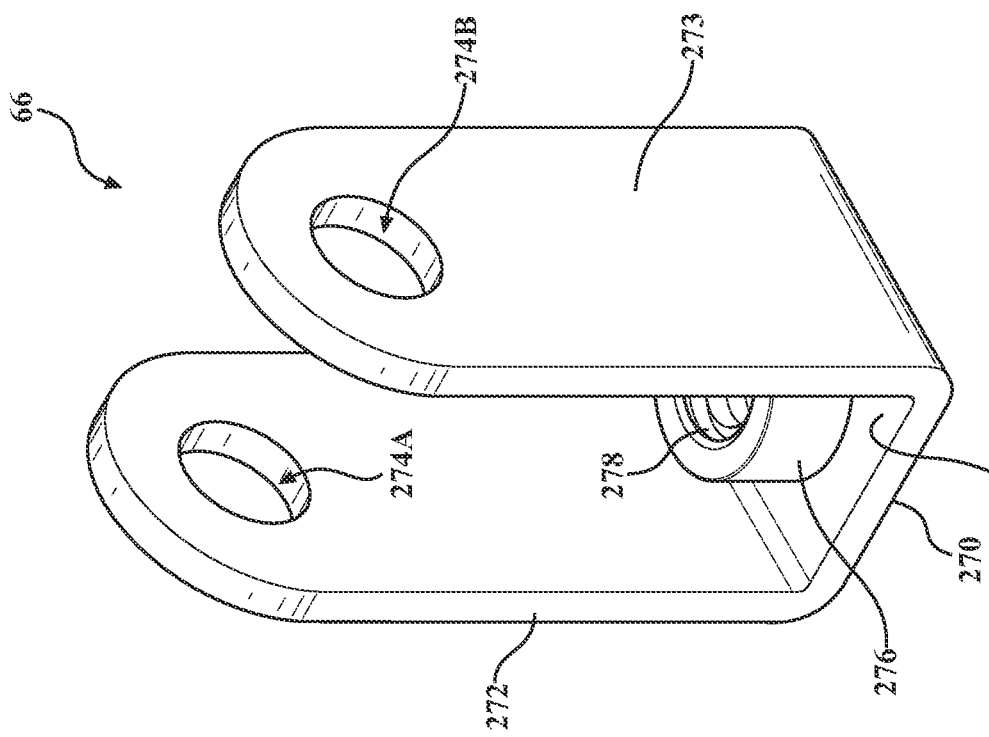
FIG. 8 is a perspective view of the u-shaped bracket of FIGS. 1-6.

As shown in FIGS. 5-9, the incremental adjustment device 93 includes a bracket 66. As best shown in FIGS. 8 and 9 in one exemplary embodiment, the bracket 66 has a U-shaped configuration that includes a base 270 and a pair of legs 272, 273 extending from and transverse to the base 270. Each of the legs 272, 273 defines an aperture 274A, 274B. A nut, here a permanent nut 276, is secured to an inward surface 277 of the base 270, with the nut 276 including internal threads 278 defining an inner threaded opening 78A that extends through the base 270 between the inward surface 277 and an opposing outward surface 279. As shown in FIG. 7, the incremental adjustment device 93 also includes a bolt 79 coupled to the bracket 66. In particular, a shaft 81 of a bolt 79 extends through the opening 36A of the ledge 36 and within the threaded opening 278A of the nut 276 and is threadingly engaged to the internal threads 278 of the nut 276 and with a head 85 of the bolt 79 in contact with the lower side 39 of the ledge 36. Accordingly, the incremental adjustment device 93 is at least partially attached to first support beam 23A through the vertical slot 44.

As previously mentioned, the alignment device 48 includes the pulley 64. As illustrated in FIGS. 5-7, in the assembled state, the pulley 64 is sandwiched between the pair of legs 272, 273. The pulley 64 and the bracket 66 are secured to the first support beam 23A utilizing a fastening system 68. As also shown in FIGS. 5-7, the fastening system 68 includes the bolt 51 disposed through the vertical slotted opening 44 of the first support beam 23A, through the aperture 274B of the leg 273 of the bracket 66, through the pulley 64, and through the aperture 274A of the leg 272 of the bracket 66. The fastening system 68 further includes a nut 49 configured to receive a shaft 51A of the bolt 51 to secure the bracket 66 to the first support beam 23A.

With continued reference to FIGS. 5-7, the alignment device 48 further includes a mounting bolt 82 having with head portion 83 and a threaded shaft 84 extending from the head portion 83 with the threaded shaft 84 inserted through the at a selected one of the first plurality of mounting positions 40 within the first support beam 23A.

The threaded shaft 84 receives the second cable end 56 to attach the second cable end 56 to the first support beam 23A at the selected one of the first plurality of mounting positions 40. In an embodiment, the second cable end 56 forms a loop 56A that is disposed around the threaded shaft 84 adjacent to the first support beam 23A. In certain embodiments, a loop 56A at the second cable end 56 can be introduced and secured via a fitting 86 such as a capel. A washer 88 and a nut 91 are disposed over the threaded shaft 84 to secure the second cable end 56 to the first support beam 23A at the selected one of the first plurality of mounting positions 40, with the loop 56A of the second cable end 56 positioned between the washer 88 and the first support beam 23A, and with the first support beam 23A between the head portion 83 and the loop 56A of the second cable end 56 in the secured state.

The cable 52 of the storage apparatus 20 is movable along the alignment device 48 to move the second cable end 56 from the selected one of the first plurality of mounting positions 40 (such as shown in FIGS. 5 and 6) to another one of the first plurality of mounting positions 40 (not shown) for adjusting the support structure 21 relative to the structure 10.

For example, prior to attaching the storage apparatus 20 to the structure 10, the user inserts the cable 52 within the groove 62 of the pulley 64 (i.e., the cable 52 is disposed about the pulley 64. The pulley 64 is positioned sandwiched between the legs 272, 273 of the bracket 66 of the incremental adjustment device 93 and the threaded opening 278A is aligned with an opening 36A of the ledge 36. The shaft 81 of the bolt 79 is inserted through the opening 36A of the ledge 36 and within the threaded opening 278A of the nut 276 and is threadingly engaged to the threads 278 of the nut 276 and with the head 85 of the bolt 79 in contact with the lower side 39 of the ledge 36 to secure the bracket 66 to the ledge 36. Next, the bolt 51 is disposed through the vertical slotted opening 44 of the first support beam 23A, through the aperture 274B of the leg 273 of the bracket 66, through the pulley 64, and through the aperture 274A of the leg 272 of the bracket 66. The nut 49 is threaded onto the shaft 51A of the bolt 51 to secure the bracket 66 to the first support beam 23A with the second cable end 56 extending from the groove 62 of the pulley 64 toward the one or more mounting positions.

Next, the user selects one of the mounting positions 40 of the first support beam 23A, and attaches the second cable end 56 to the first support beam 23A at the selected mounting position 40. This is accomplished by disposing the threaded shaft 84 of the bolt 82 through the aperture 40 corresponding to the selected mounting position 40 such that the head portion 83 abuts one of the sides 32, 34 of the first support beam 23A attaching the second cable end 56 to the threaded shaft 84 of the bolt 82 protruding through the other one of the sides 32, 34 of the first support beam 23A, and securing the bolt 82 to the first support beam 23A by securing the washer 88 and the nut 91 to the threaded shaft 84. In the embodiment shown, the head portion 83 of the bolt 82 abuts the outer side 34 of the first support beam 23A, and the washer 88 and the nut 91 are attached to the threaded shaft 84 adjacent to the inner side 32 of the first support beam 23A. In the secured state, the cable 52 inward of the second cable end 56 is seated in the groove 62 of the pulley 64.

During adjustment of the support structure 21, the user optionally detaches the storage apparatus 20 from the structure 10, detaches the bolt 82 from the first support beam 23A, and selects a new mounting position 40 on the first support beam 23A. In an example, the new mounting position 40 corresponds to a new desired height of the support structure 21. The user then reintroduces the bolt 82 with the threaded shaft 84 extending through the new aperture/mounting position 40. The user moves the cable 52 (which remains seated in the groove 62 of the pulley 64) along the groove 62 until the second cable end 56 is aligned with the newly selected mounting position 40 and threaded shaft 84 of bolt 82, and positions the loop 56A of the second cable end 56 around the threaded shaft 84. The user than secures the bolt 82 to the first support beam 23A by securing the washer 88 and the nut 91 to the threaded shaft 84 with the loop 56A of the second cable end 56 positioned between the washer 88 and first support beam 23A.

When the new mounting position 40 including the bolt 82 is further from the pulley 64, a longer portion of the second cable end 56 of the cable 52 is positioned between the pulley 64 and the bolt 82, which pivots the first support beam to raise the second beam end 28 of the first support beam away from the floor and toward the roof of the structure 10. Conversely, when the new mounting position 40 including the bolt 82 is closer to the pulley 64, a shorter portion of the second cable end 56 of the cable 52 is positioned between the pulley 64 and the bolt 82, which pivots the first support beam to lower the second beam end 28 of the first support beam toward the floor and away the roof of the structure 10.

In the new mounting position, it is desirable that the first support beam 23A is substantially level (i.e., the length $L_1$ of the first support beam 23A between the first beam end 26 and second beam end 28 is horizontal and parallel to the floor within approximately 5 degrees of level to the plane defining the top surface of the floor).

After the second cable end 56 is mounted in a desired position, the user may then adjust the incremental adjustment device 93 to make incrementally small adjustments to the relative location of the bolt 79 within the vertical slotted opening 44 and within the threaded opening 278A of the nut 276 to further level the support structure 21 relative to the structure 10.

In particular, the user may turn bolt 79 in a first rotational direction, which causes the shaft of the bolt 79 to travel along the threads 278 of the nut 276 while the head 85 of the bolt 79 remains in contact with the lower side 39 of the ledge 36, which in turn causes the bracket 66 to travel in a first travel direction away from the ledge 36, which in turn causes the first support beam 23A to pivot slightly relative to the first beam end 26 such that the second beam end 28 is lowered toward the floor of the structure 10. Alternatively, the user may turn bolt 79 in a second rotational direction opposite the first rotational direction, which causes the shaft of the bolt 79 to travel along the threads 278 while the head 85 remains in contact with the lower side 39 of the ledge 36, which in turn causes the bracket 66 to travel in in the opposite travel direction toward the ledge 36, which in turn causes the first support beam 23A to pivot slightly relative to the first beam end 26 such that the second beam end 28 is raised away from the floor of the structure 10 and relative to the first beam end 26. The raising or lowering of the second beam end 28 allows the length of the first support beam 23A to be more precisely aligned horizontally to level the support structure 21 without having to reposition the bolt 82 through the aperture 40 associated with another selected mounting position 40 in an attempt to level the support structure 21.

Notably, the relative amount of raising or lowering of the second beam end 28 of the first support beam 23A is a function of the length of the vertical slotted opening 44 in the first support beam 23A. More in particular, the shaft 51A of the bolt 51 remains positioned within the vertical slotted opening 44 in the first support beam 23A at all times and travels along the vertical slotted opening 44 in the same direction as the bracket 66 travels relative to the ledge 36 with the head 85 of the bolt 79 remaining in contact with the lower side 39 of the ledge 36.

As also shown in FIGS. 1-6, the storage apparatus 20 includes a mounting bracket 22 extending transverse to the first beam axis A and attached to the first 23A and second 23B support beams. The mounting bracket 22 is also transverse to the second beam axis B. Additionally, the mounting bracket 22 also extends along the longitudinal axis LA. The mounting bracket 22 is configured to attach the storage apparatus 20 to the wall 14 of a structure 20 such that the support structure 21 is positioned at a desired height relative to the structure 10 (such as relative to the wall 14 or to the ceiling 16) or relative to a floor. In addition, the mounting bracket 22 is expandable between and including a minimum bracket position and a maximum bracket position.

As illustrated in the FIGS. 1-6, in one exemplary embodiment, the mounting bracket 22 includes the middle rail 50, the first side rail 70 slidingly coupled to a first end 123 of the middle rail 50, and the second side rail 90 slidingly coupled to a second end 126 of the middle rail 50, with the first end 123 being opposite the second end 126 along the longitudinal axis LA. The sliding arrangement of the rails 70, 90 relative to the middle rail 50 allows the length of the mounting bracket 22 to be expanded, or contracted to a desired position between and including a minimum bracket position and a maximum bracket position, as will be discussed further below.

Optionally, the middle rail 50 can be removed, and instead the first side rail 70 is slidingly coupled with the second side rail 90 to extending between a minimum bracket position and a maximum bracket position, as will be discussed further below. Stated another way, the mounting bracket 22 includes the first side rail 70 slidingly coupled with the second side rail 90.

Each of the middle rail 50 and the side rails 70, 90 of the mounting bracket 22 may be formed of any suitable material, such as a metal, a metal alloy, a polymer or plastic, a natural material (e.g., wood), and/or the like, and/or combinations thereof. In the illustrated embodiments, the mounting bracket 22 is adapted to be coupled to the structure 10. In an embodiment, the mounting bracket 22 is adapted to be positioned directly adjacent to and at least partially in contact to the structure 10. In the embodiments illustrated in FIGS. 1-6, each of the middle rail 50 and the side rails 70, 90 are adapted to be attached to the structure 10, and more particularly attached to the studs 12 and wall 14 of the structure 10.

As best shown in FIG. 2, the middle rail 50 includes a body portion 130 having front facing surface 132 which is flat or substantially flat and defines a front longitudinal plane and a rear facing surface 134 which is substantially flat and defines a rear longitudinal plane, with the front longitudinal plane preferably parallel to the rear longitudinal plane. The term "substantially flat" allows slight variations in the surface of the middle rail 50 due to manufacturing tolerances or due to slight bending of the rails 50 during installation or after installation of the rails.

In addition, as also shown in FIG. 2, the middle rail 50 also includes a ledge 131 extending transverse from the front facing surface 132 along the bottom edge 142. The ledge 131 is configured to receive one or more storage racks 29 thereupon.

The body portion 130 also defines one or more slot openings 154 extending between the front facing surface 132 and rear facing surface 134 between the first end 123 and the second end 126. The slot openings 154 are preferably aligned longitudinally and parallel to each of a top edge 140 and a bottom edge 142 and are configured to receive fastening devices (such as with fasteners, rivets, and/or another suitable fastening system—not shown) therethrough to assist in fastening the mounting bracket 22 to the stud 12 in the desired location on the structure 10, as will be described in further detail below. The body portion 130 also defines the apertures 156 (see FIGS. 2 and 4) aligned longitudinally and parallel to each of the top and bottom edges 140, 142 and are configured to receive fastening devices 261 therethrough to assist in fastening the middle rail 50 to a respective one of the side rails 70, 90, as will also be discussed further below. The apertures 156 may be rectangular or squared shaped, as shown in the Figures.

Each of the side rails 70, 90 have respective front facing surfaces 162, 182 and opposing rear facing surfaces 164, 184 which are flat or substantially flat (similar to the middle rail 50, with substantially flat defined as above) extending in length between the respective first ends 166, 168 and second ends 186, 188.

To expand the mounting bracket 22 prior to mounting the mounting bracket 22 to the structure 10 in embodiments in which the middle rail 50 is included (or after mounting the middle rail 50 to the structure 10 but prior to mounting the side rails 70, 90 to the structure 10), the user slides each of the side rails 70, 90 outwardly away from the middle rail 50 and away from the minimum bracket position until the outermost one of the respective slot openings 174, 194 at the first and second bracket ends 166, 188 of the respective side rails 70, 90 are aligned at a desired bracket position with a corresponding respective stud 12 contained in the wall 14. The slot openings 174, 194 are preferably in the shape of a rectangle. Preferably, the discrete openings of the slot openings 174, 194 are aligned on an axis (and when the mounting bracket 22 also includes the middle rail 50 wherein the slot openings 174, 194 are aligned on an axis with the slot openings 154 of the middle rail 50) This expansion of the side rails 70, 90 extends between and including the minimum bracket position (in which the length between ends 166, 188 of the mounting bracket 22 is minimized) and a maximum bracket position (in which the length between the ends 166, 188 of the back bracket assembly is maximized), and the desired position can be in any position between the minimum and maximum bracket position, including the minimum or maximum bracket position. Once in the desired position, the user may then mount the mounting bracket 22 (i.e., mount each of the side rail portions 70, 90 and mount the middle rail 50 if not previously mounted) to the structure 10.

To expand the mounting bracket 22 prior to mounting the mounting bracket 22 to the structure 10 in embodiments in which the middle rail 50 is not included (prior to mounting both of the side rails 70, 90 to the structure 10), the user slides one of the side rails 70, 90 outwardly away from the from the other of the side rails 70, 90 from the minimum bracket position until the outermost one of the respective slot openings 174, 194 at the first and second bracket ends 166, 188 of the respective side rails 70, 90 are aligned at a desired bracket position with a corresponding respective stud 12 contained in the wall 14. This expansion of the side rails 70, 90 extends between and including the minimum bracket position (in which the length between ends 166, 188 of the mounting bracket 22 is minimized) and a maximum bracket position (in which the length between the ends 166, 188 of the mounting bracket 22 is maximized), and the desired position can be in any position between the minimum and maximum bracket position, including the minimum or maximum bracket position. Once in the desired position, the user may then mount the mounting bracket 22 (i.e., mount each of the side rail portions 70, 90 and optionally mount the middle rail 50 if present and not previously mounted) to the structure 10.

In certain embodiments, the minimum bracket position corresponds to a position in which the ends 166, 188 of the respective side rails 70, 90 are aligned along the respective beam axis A, B of a corresponding one of the support beams 23A, 23B and corresponds to the minimum allowable length between the respective ends 166, 188 of the side rails 70, 90. Further, the maximum bracket position corresponds to a position in which the ends 166, 188 of the respective side rails 70, 90 are spaced outwardly away from each other relative to the respective beam axis A, B of a corresponding one of the support beams 23A, 23B and corresponds to the maximum allowable length between the respective ends 166, 188 of the side rails 70, 90.

In alternative related embodiments, as opposed to aligning the outermost one of the respective slot openings 174, 194 at the first and second bracket ends 166, 188 of the respective side rails 70, 90 with the corresponding respective stud 12 contained in the wall 14, the subject application also contemplates a different respective slot opening 174, 194 other than the outermost one of the slot openings 174, 194 at one or both of the first and second bracket ends 166, 188 of the respective side rails 70, 90 being aligned with a respective stud 12 in the wall and with a respective fastener being inserted within this alternative slot opening 174, 194 to secure the respective side rails 70, 90 to the wall 14.

Even still further in addition to securing the respective side rails 70, 90 to the wall 14, the subject application also contemplates securing the respective side rails 70, 90 and the middle rail 50 to the structure 10 by inserting additional fastener(s) through the respective slot openings 154 in the middle rail 50 and/or through additional slot openings 174, 194 located at other positions inward of the first and second bracket ends 166, 188 of the respective side rails 70, 90. Preferably, such additional fasteners are secured to the corresponding additional aligned studs 12 in the walls 14.

As best shown in FIG. 2, and also similar to the middle rail 50, each of the side rails 70, 90 includes a ledge 161, 181 extending transverse from the bottom edge 172, 192 in a direction inwardly from the front facing surface 162, 182 in a direction opposite the rear facing surface 164, 184 and opposite the top edge 170 and bottom edge 190. The ledge 161, 181 is configured to receive a rack 29 thereupon and are configured to align longitudinally with the ledge 131 from the middle rail 50 in the assembled state.

Similar to the body portion 130 of the middle rail 50, each of the side rails 70, 90 also defines one or more slot openings 174, 194 extending between the front facing surface 162, 182 and opposing rear facing surface 164, 184 respective first ends 166, 168 and second ends 186, 188. The slot openings 174, 194 are preferably aligned longitudinally and parallel to each of the top edges 170, 190 and bottom edges 172, 192, and are configured to receive fastening devices (such as with fasteners, rivets, and/or another suitable fastening system-collectively fasteners 199 and in particular flat head fasteners 199 see FIGS. 1, 3 and 4 that preferably do not protrude outwardly from the mounting bracket 22) therethrough to also assist in fastening the mounting bracket 22 to the structure 10 in the desired location on the structure 10, as will be described in further detail below.

Similar to the body portion 130 of the middle rail 50, each of the side rails 70, 90 also defines a plurality of apertures 176, 196 aligned longitudinally and parallel to each of the top edges 170, 190 and bottom edges 172, 192, and are configured to receive fastening devices 261 therethrough to assist in fastening the respective one of the side rails 70, 90 to the middle rail 50 as will also be discussed further below.

The apertures 156, 176, 196 may be in the shape of a rectilinear polygon (i.e., rectangular or square shaped), as illustrated in the Figures) and are preferably aligned along an axis, with the axis and hence the apertures 156, 176, 196 being parallel with the corresponding slotted openings 154, 174, 194 when the side rails 50, 70, 90 are coupled together to form the mounting bracket 22.

Still further, the side rail 70 is also configured to be attached to the first support beam 23A, while the side bracket 90 is also configured to be attached to the second support beam 23B, through the use of fastening devices (such as described above) positioned through a respective one or more of the slot openings 174, 194 and/or through one of the apertures 176, 196.

In particular, to attach the first support beam 23A to the side rail 70, the flange 38 at the first beam end 26 of the first support beam 23A is positioned against the front facing surface 162 of the side rail 70, fasteners 261 are used to attach the flange 38 of the first support beam 23A through one of the slot openings 174 and/or through one of the apertures 176 of the side rail 70, thereby fastening the first support beam 23A to the side rail 70 but. Similarly, to attach the second support beam 23B to the side rail 90 the flange 38 at the first beam end 26 of the second support beam 23B is positioned against the front facing surface 182 of the side rail 90, 261 are used to attach the flange 38 of the second support beam 23B through one of the slot openings 194 of the side rail 90, thereby fastening the second support beam 23B to the side rail 90.

The fasteners 261, as best shown in one representative embodiment as in FIG. 3A used to secure the flange 38 to the side rail 70, preferably includes a carriage bolt 263 having a head portion 265 and a threaded shaft 267 extending from the head portion 263. In addition, the fastener 261 includes a nut 269.

To secure the flange 38 to the side rail 70, as shown in FIGS. 3 and 3A, the threaded shaft 267 of a carriage bolt 263 is inserted through the aperture 156 of the side rail 70 and through a corresponding opening (not shown) near the bottom of the flange 38 with the head portion 263 positioned between the structure 10 and the side rail 70. The nut 269 is threaded onto the threaded shaft 267 and tightened such that it abuts the outer surface of the flange 38 opposite the front facing surface 162 of the side rail 70. Similarly, the threaded shaft 267 of a second carriage bolt 263 is inserted through the slot opening 174 of the side rail 70 and through a corresponding opening (not shown) near the top of the flange 38 with the head portion 263 positioned between the structure 10 and the side rail 70. The nut 269 is threaded onto the threaded shaft 267 and tightened such that it abuts the outer surface of the flange 38 opposite the front facing surface 162 of the side rail 70. Notably, the head portion 263 of the carriage bolt is small and flat and does not protrude from the side rail 70 and thus allows the side rail 70 to be positioned adjacent to the structure 10 such as the wall 14.

The storage apparatus 20 further includes the front support beam 25 spaced from the mounting bracket 22 and extending transverse to the first beam axis A. The front support beam 25 is also transverse to the second beam axis B. Additionally, the front support beam 25 extends along the longitudinal axis LA. The front support beam 25 is attached to the first 23A and second 23B support beams, and has first and second beam ends and a length $L_3$ extending between the first and second beam ends along the longitudinal axis LA. Additionally, the front support beam 25 has a top surface 31.

The front support beam 25 further has a body 176 with an inner side 178 and an outer side 180 and a ledge 231 (shown in phantom in FIG. 2) extending inwardly from the inner side 178 of the body 176. The front support beam 25 further has a first flange 284 and second flange 286 (also shown in phantom in FIG. 2) at the first and second beam ends, respectively. The first flange 284 is directly attached to the first support beam 23A (such as with fasteners 203 (see FIGS. 1 and 2)) to interconnect the front support beam 25 and the first support beam 23A, and the second flange 286 is directly attached to the second support beam 23B (such as with fasteners 203) to interconnect the front support beam 25 and the second support beam 23B. Preferably, the fasteners 203 are flat headed fasteners. The front support beam 25 may be formed of any suitable material, such as a metal, a metal alloy, a polymer or plastic, a natural material (e.g., wood), and/or the like, and/or combinations thereof. In the illustrated embodiments, the front support beam 25 is spaced from the structure 10, but adapted to be coupled to the structure 10.

In an embodiment, the front support beam 25 may be formed as a single piece. In another embodiment, such as shown in FIGS. 1-6, the front support beam 25 has interconnected first 25A and second 25B beam segments. Each of the first 25A and second 25B beam segments of the front support beam 25 has first and second segment ends. The first segment end of the first beam segment 25A is interconnected to the second segment end of the second beam segment 25B utilizing a central bracket segment 25C. In other words, both of the first 25A and second 25B beam segments are attached to the central bracket segment 25C, which interconnects the first 25A and second 25B beam segments to form the front support beam 25. In embodiments having first and second beam segments 25A and the central bracket segment 25C, the ledge 231 may be partially defined by and extending inwardly from the inner side 178 of each of the beam segments 25A, 25B and central bracket segment 25C.

As shown in FIG. 2, the storage apparatus 20 also includes a plurality of additional support cross beams 24 coupled to the one of the side rails 70, 90 or to the middle rail 50 of the mounting bracket 22. Each of the additional support cross beams 24 are positioned between and spaced from the first support beam 23A and the second support beam 23B.

The support cross beam(s) 24 may have any suitable configuration. In an embodiment, the cross beam(s) 24 has a U-shaped configuration in cross-section and defines a channel 24A. The cross beam(s) 24 is supported by the mounting bracket 22 and the front support beam 25 and movable along the longitudinal axis LA relative to the mounting bracket 22 and the front support beam 25 but remaining transverse, and preferably normal to the longitudinal axis LA to adjust a position of the cross beam(s) 24. In the embodiment shown, the cross beam(s) 24 is seated against and movably supported by the respective ledges 131, 161, 181 and 231 of the mounting bracket 22 and the front support beam 25. Once positioned, the cross beam(s) 24 rests against the ledges 131, 161, 181 and 231. Notably, the cross beam(s) 24 is not mounted or fixed to the mounting bracket 22 and the front support beam 25 and remains movable along the longitudinal axis LA.

As noted above, the storage apparatus 20 also includes the front support beam 25 that extends parallel to the mounting bracket 22. In certain, the front support beam 25 includes a plurality of front support brackets (shown in FIG. 1 as a first and second support beam segments 25A and 25B fastened together. Still further, each of the front support beams/ segments 25, 25A, 25B similar to the mounting bracket 22, includes a ledge 231 (shown in phantom in FIG. 2) extending inwardly toward the mounting bracket 22 in an assembled state, with the ledge 231 configured to receive the storage racks 29 thereupon, with the upper surface of ledge 231 preferably aligned with the upper surface of respective ledges 131, 161, 181 when the support structure 21 is fully assembled.

The mounting bracket 22, the front support beam 25, the first and second support beams 23A, 23B and the support cross beams 24, if present, collectively define a support structure 250.

As previously mentioned, the storage apparatus 20 further has the support structure 21 with the support structure 21 abutting and being supported by the support structure 250.

In particular, the support structure 21 abuts the support cross beams 24. Additionally, the support structure 21 is removably supported by the first support beam 23A and the second support beam 23B and the front support beam 25. In the embodiments illustrated in FIGS. 1-6, the support structure 21 is further defined as a plurality of storage racks 29 arranged adjacent one another. Each storage rack 29 may have any length or width, and may be formed of any suitable material, such as a metal, a metal alloy, a plastic, etc.

As best shown in FIG. 1, and in embodiments including at least one cross beam 24, each storage rack 29 has a main portion 116 and a lip 118 extending from one, or both, sides of the main portion 116 that extend parallel to the first and second support beams 23A, 23B. As described in further detail below, the lip 118 is configured to be disposed within the channel 24A of one of the cross beams 24 to mount or secure the storage rack 29 to the cross beam 24. The lip 118 of one of the plurality of storage racks 29 and the lip 118 of an adjacent one of the plurality of storage racks 29 are disposed within the channel 24A of a common cross beam 24 to mount or secure the one of the plurality of storage racks 29 and the adjacent one of the plurality of storage racks 29 to the cross beam 24. In other words, the channel 24A of the cross beam 24 is configured to receive both the lip 118 of one storage rack 29 and the lip 118 of an adjacent storage rack 29 to mount or secure the storage rack 29 to the cross beam 24. In instances where the storage apparatus 20 has a plurality of cross beams 24, the lip 118 of one of the plurality of storage racks 29 and the lip 118 of an adjacent one of the plurality of storage racks 29 are disposed within the channel 24A of a common one of the plurality of cross beams 24.

In each embodiment, the storage racks 29 include a pair of end racks 29A (i.e., a respective end pair 29A of storage racks 29) and optionally one or more middle racks 29B each respectively disposed between the pair of end racks 29A. One of the pair of end racks 29A is positioned adjacent the first support beam 23A (see FIG. 4) and the other one of the pair of end racks 29A is positioned adjacent the second support beam 23B.

Each respective end rack 29A has the main portion 116 and the lip 118 extending from one side. In addition, the end rack 29A includes a foot 120 extending from the opposing side of the main portion 116. The respective lips 118 of the two end racks 29A are disposed within a channel 24A of a different cross beam 24 if more than one cross beam 24 are present in the storage apparatus 20. In the instance where only one cross beam 24 is present in the storage apparatus 20, the respective lips 118 of two adjacent end racks 29A are received in the channel 24A of a common single cross beam 24. Additionally, the foot 120 of one of the pair of end racks 29A is seated against or supported by the ledge 36 of the first support beam 23A to mount one of the pair of end racks 29A to the first support beam 23A and one of the cross beams 24. The foot 120 of the other one of the pair of end racks 29A is seated against or supported by the ledge 36 of the second support beam 23B to mount the other of the pair of end racks 29A to the second support beam 23B and to one of the cross beams 24.

The middle racks 29B, include a pair of opposing lips 118 extending from either side of the main portion 116 (i.e., the foot 120 of the end rack 29A is replaced with another lip 118 in the middle rack 29B).

Mounting of the adjacent storage racks 29 to a common cross beam 24 is accomplished without using locking tabs, bolts, clamps, and/or welded connections between the adjacent storage racks 29. Additionally, it should be appreciated that while the respective lips 118 of the adjacent storage racks 29 extend into the channel 24A, the main portion 116 is seated and rests against the legs of the 'U' of the U-shaped cross beam 24. This enables weight transfer between the adjacent storage racks 29. Additionally, the storage racks 29 are removable from the cross beam 24, which may be accomplished by simply lifting each storage rack 29 off the cross beams 24.

The sequence for securing the end rack 29A to the first support beam 23A and one of the support cross beams 24 is as follows. First, the foot 120 of the end rack 29A is positioned adjacent the ledge 36 of the first support beam 23A and is subsequently seated against the ledge 36. Next, the end rack 29A is moved downwardly so that the lip 118 is received within the channel 24A of the cross beam 24 to secure the end rack 29A to the first support beam 23A and the support cross beam 24. The same procedure may be used to secure the other end rack 29A to the second support beam 23B and one of the cross beams 24.

The middle rack 29B may be secured to adjacent cross beams 24 of the storage apparatus 20 utilizing a sequence similar to that described above for the end rack 29A. For example, the first lip 118 of the middle rack 29B is received or disposed within one of the channels 24A of the cross beams 24, and then the middle rack 223 is moved downwardly so that the opposing lip 118 is received or disposed within the channel 24A of the other one of the cross beams 24 to mount the middle rack 223 to the adjacent cross beams 24.

The subject disclosure also provides an associated method for reversibly mounting the storage apparatus 20 of FIGS. 1-9 to a structure 10 within a room of building, such as within a basement or garage of a user, and in particular to the wall 14 of the structure 10 that effectively and easily mounts the mounting bracket 22 and the cable system 27 to the studs 12 located in the structure 10.

Figure 10:
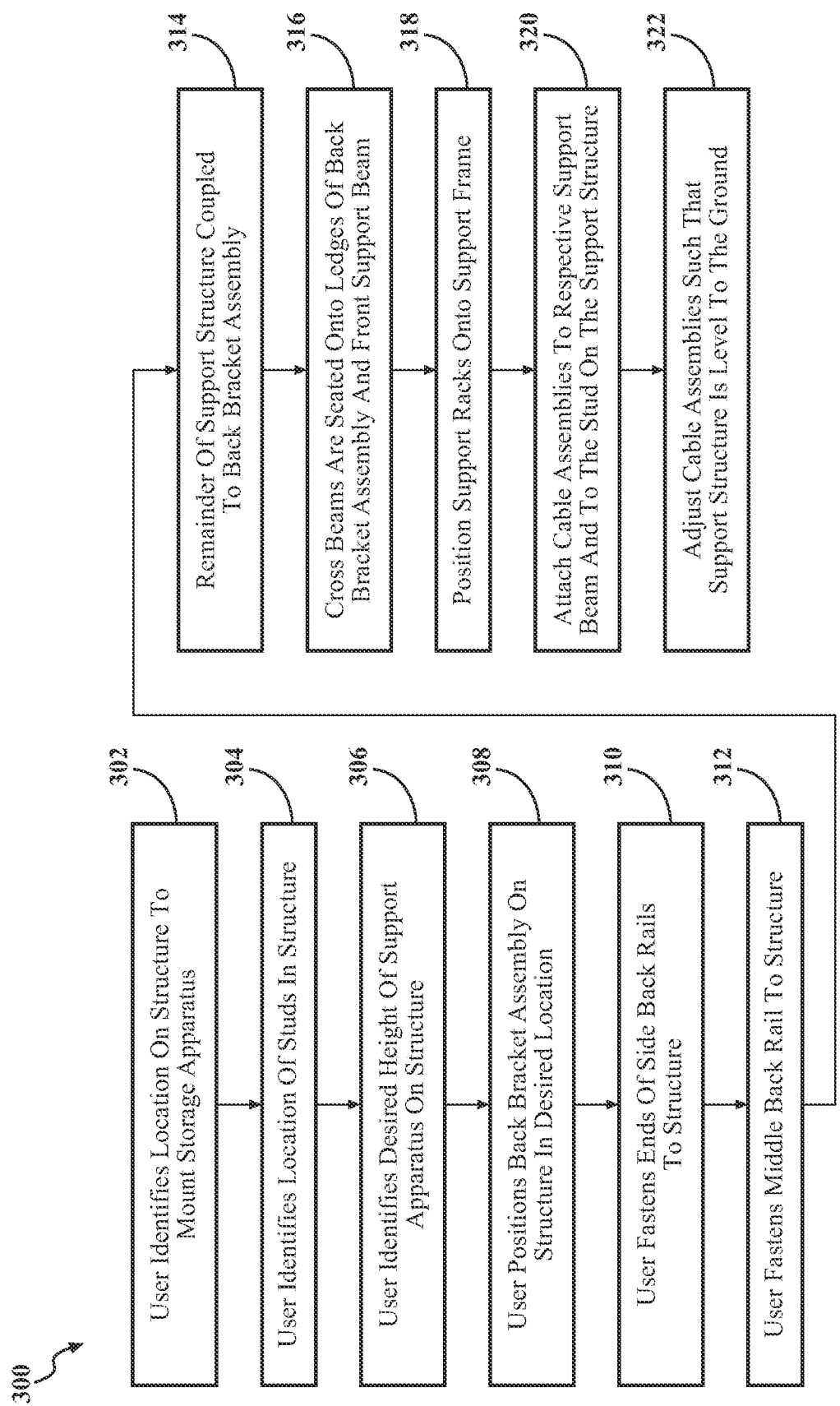
FIG. 10 is a logic flow diagram for mounting the storage apparatus of FIGS. 1-9 to a wall of a structure.

In particular, the process 300, as illustrated in FIG. 10, begins in Step 302 wherein a user identifies a structure 10 to mount the storage apparatus 20, such as to the wall 14 and/or to the ceiling 16.

Next, in Step 304, the user identifies the location of the studs 12 contained within the structure 10.

Next, in Step 306, the user identifies the desired height for the storage apparatus 20 to be secured to the wall 14 relative to the structure 10 or ground and fastens the middle rail 50 of the mounting bracket 22 to the wall 14 with fasteners 199 that extend through one of the slot openings 154 in the body 30 aligned with the stud 12. The slot openings 154 are preferably in the shape of a rectangle.

Next, in Step 308, the user positions the mounting bracket 22 on the structure 10 in desired location. At a part of Step 308, the user slides each of the side rails 70, 90 outwardly away from the middle rail 50 (if present) until the outermost one of the respective slot openings 174, 194 at the ends 166, 188 of the respective side rails 70, 90 are aligned at a desired bracket position (corresponding to a corresponding length between the first end 166 and the second end 188) with a corresponding respective stud 12 contained in the wall 14. This expansion of the side rails 70, 90 (from each other outwardly from the middle rail 50 when present) extends between and including a minimum bracket position (in which the length between ends 166, 188 of the mounting bracket 22 is minimized) and a maximum bracket position (in which the length between the ends 166, 188 of the mounting bracket 22 is maximized), and the desired position can be in any position between the minimum and maximum bracket position, including the minimum or maximum bracket position.

Once aligned in the desired bracket position, in Step 310, the user fastens the ends 166, 186 of each of the side rails 70, 90 of the mounting bracket 22 to the wall 14 with fasteners 199 that extend through the outermost slot opening 174, 194 aligned with the corresponding stud 12. As noted above, the fasteners 199 preferably are flat headed and thus do not protrude from the mounting bracket 22.

Next, and optionally in Step 312, the user adds additional fasteners 199 that extend through one or more other slot openings 154 in the middle rail 50 (when present) and/or other slot openings 174, 194 in the respective side rails 70, 90 that are also aligned with still further studs 12 in the walls 14 to fully fasten the back bracket system 22 to the wall 14. In an alternative method, the additional fasteners 199 are inserted through one or more other slot openings 154 in the middle rail 50 (when present) and/or other slot openings 174, 194 in the respective side rails 70, 90 prior to or concurrently with Step 310.

Next, in Step 314, the remainder of the support structure 250 is coupled to the mounting bracket 22 and secured to the wall 14. In particular, each of the support beams 23A, 23B are respectively attached to the wall 14 through the respective side rail 70, 90 of the mounting bracket 22 using fasteners 201 and the front support beam 25 is fastened to each of the respective support beams 24 by extending fasteners 203 through the flanges 284, 286 of the front support beam 25 and through the respective second beam end 28 of the respective support beam 23A, 23B. Moreover, the respective side rail 50, 70, 90 are attached to the respective flange 38 of the respective support beam 23, 23A, 23B using a fastener 261 (see FIG. 3A above that illustrates the attachment of the flange 38 to the side rail 70 as one representative example), and similarly the cross beams 24 may also be attached to a respective side rail 50, 70, 90 using a fastener 201 or fastener 261. Optionally, the support beams 23, 23A, 23B and/or the cross beams 24 can be attached to the respective rails 50, 70, 90 using fasteners 261 prior to Steps 310 and 312.

In Step 316, if utilized, the cross beams 24 are seated onto one of the ledges 131, 161, 181 of the mounting bracket 22 and onto the ledge 231 of the front support beam 25 at a desired position between and spaced from each of the support beams 23A and 23B.

Next, in Step 318, the storage racks 29, 29A, 29B are positioned onto the support structure 250. In particular, the foot 120 of each of the end racks 29A is positioned onto a respective ledge 36 of the first or second support beam 23A, 23B and the respective lips 118 of each of the storage racks 29, 29A, 29B is positioned within a respective channel 24A of a respective one of the support cross beams 24. In conjunction therewith, each one of the storage racks 29, 29A, 29B is positioned onto the ledges 131, 161, 181 of the mounting bracket 22 and the ledge 231 of the front support beam 25.

In Step 320, the first cable system 27A is attached to support beam 23A and to a stud 12 in the wall 14 of the structure 10, while the second cable system 27B is attached to support beam 23B and to another stud 12 in the wall 14 of the support structure 10. In alternative embodiments, Step 320 may occur prior to the positioning of the storage racks 29, 29A, 29B in Step 318.

In Step 322, each of the first cable system 27A and the second cable system 27B are adjusted such that the support structure 21 is level to the ground. More in particular, the first cable system 27 and the second cable system 27B are adjusted such that a top surface plane defined along the top of the storage racks 29, 29A, 29B is substantially parallel to a plane defining the floor. The term "substantially parallel" refers to where the top surface plane is within 15 degrees relative to a horizontal plane defined by the surface of the floor underneath the storage apparatus. This is done by repositioning the bolt 82 at the second cable end 56 in a different one of the plurality of apertures 40 for major adjustments, as described above, or by turning the bolt 79 of the incremental adjustment device 93 in a first or second rotational direction to adjust the relative positioning of the bracket 66 relative to the ledge 36, as also described above, or both.

Figure 11:
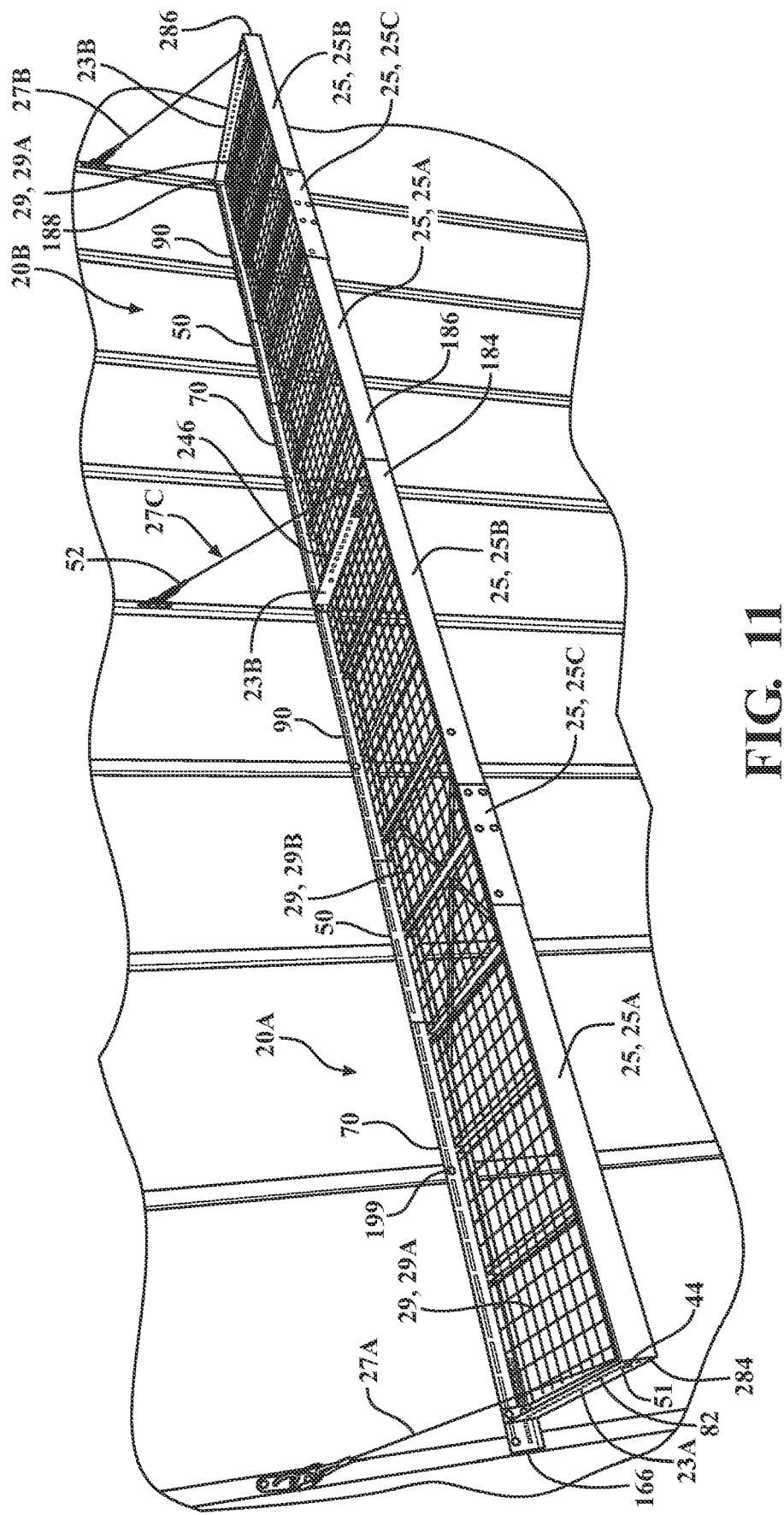
FIG. 11 is a semi-schematic perspective view of an embodiment of a pair of storage apparatus aligned with each other and attached to the wall of the structure illustrated in FIG. 1.
Figure 12A:
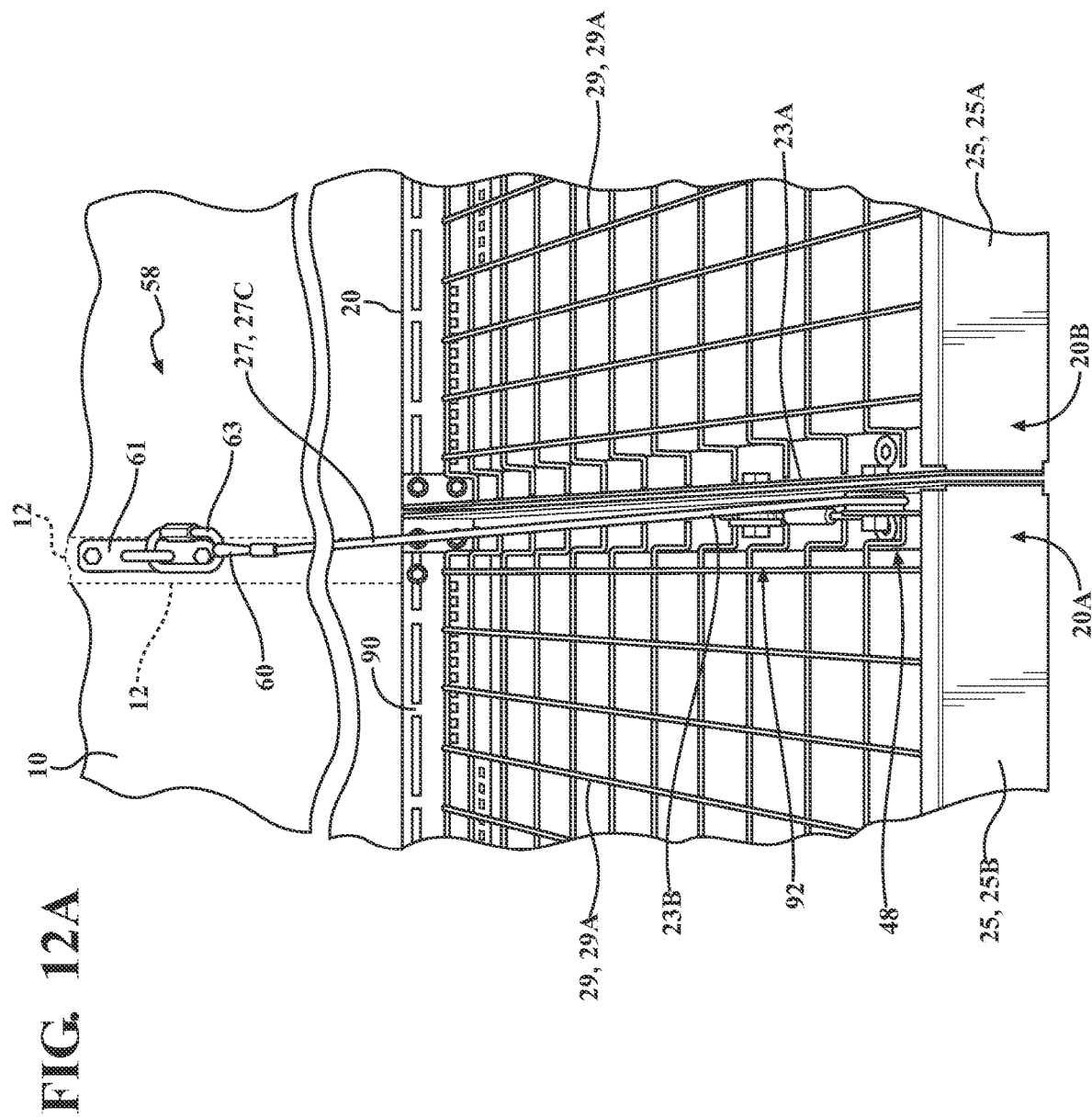
FIG. 12A is a front semi-schematic perspective view of the connection region of the pair of storages apparatus of FIG. 11.
Figure 12B:
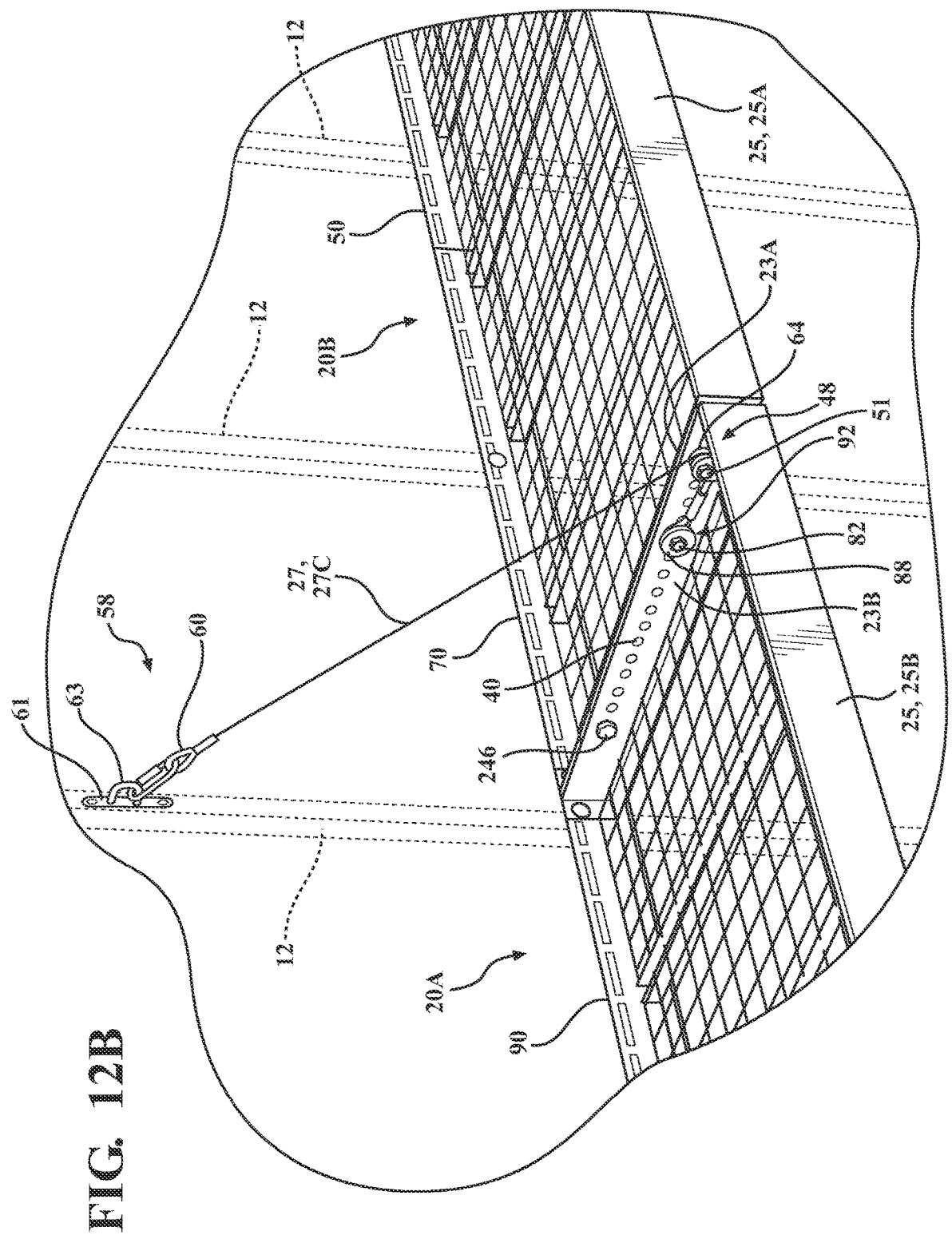
FIG. 12B is a close-up semi-schematic first side perspective view of the connection region in FIG. 12A.
Figure 12C:
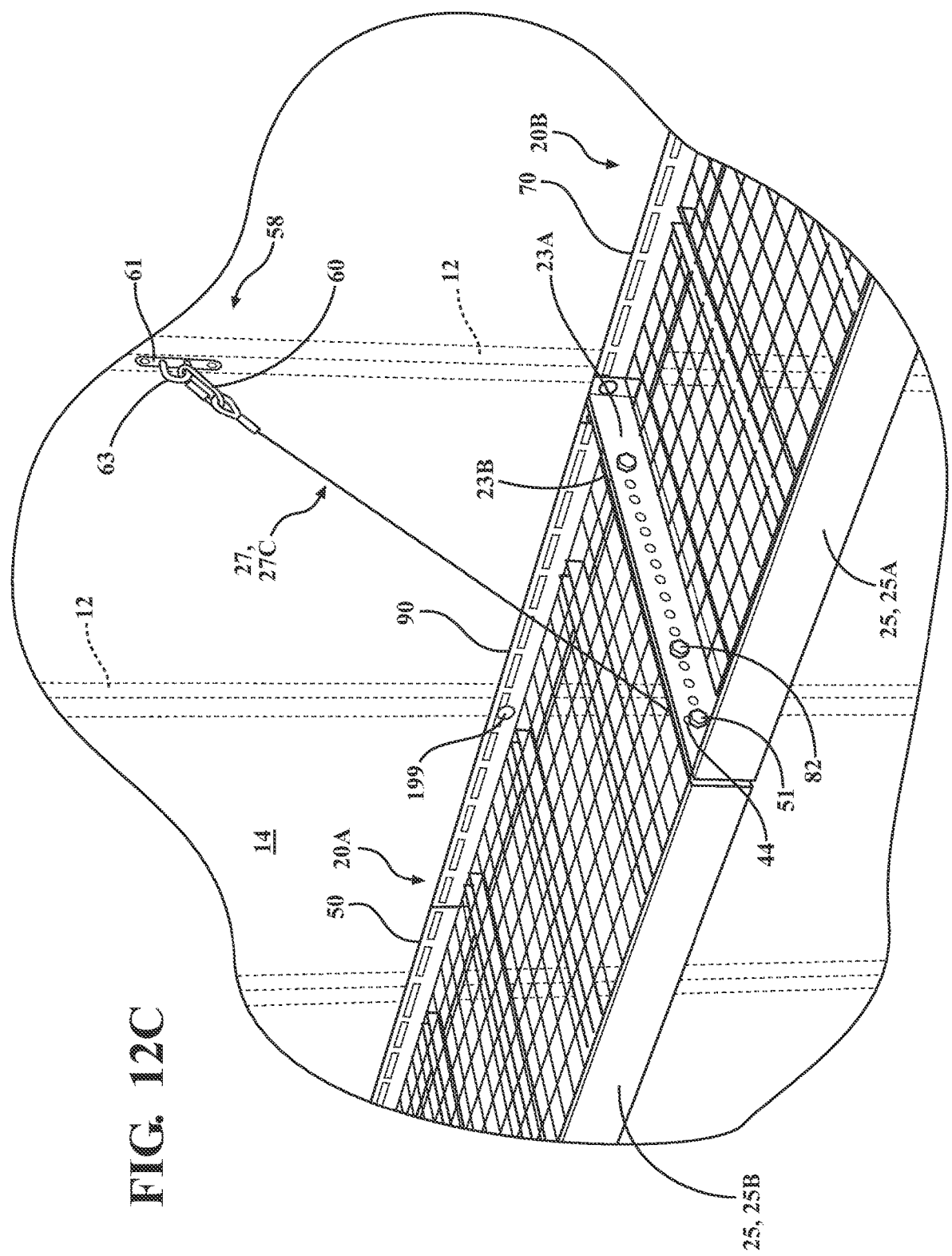
FIG. 12C is a close-up semi-schematic second side perspective view of the connection region in FIG. 12A.

In still further embodiments, as illustrated in FIGS. 11-12 (including FIGS. 12A, 12B and 12C), a pair of storage apparatus 20A, 20B may be coupled together and fastened onto the wall 14 of a structure 10. In these embodiments, the second support beam 23B of the first storage apparatus 20A is positioned adjacent to the first support beam 23A of the second storage apparatus 20B and are fastened together utilizing one or more fasteners 246 (see FIG. 12B). Further, a single, but longer, mounting bracket 22 may be utilized, and the second support beam 23B of the first storage apparatus 20A and first support beam 23A of the second storage apparatus 20B are fastened to the structure 10 (and preferably to the stud 12 in the wall 14 of the structure) by inserting a respective fastener 201 through the flange 38 of the second support beam 23B of the first storage apparatus 20A and first support beam 23A of the second storage apparatus 20B in the middle rail 50. As noted above, the fasteners 201 are preferably flat headed and do not protrude outwardly from the mounting bracket 22. In these embodiments, a single additional cable system 27C is coupled to the non-coupled side of either the second support beam 23B of the first storage apparatus 20A or the first support beam 23A of the second storage apparatus 20B in the same manner as the coupling of the first cable system 27A to the first support beam 23A, and the second cable system 27B to the second support beam 23B as in FIGS. 1-6 and is used to support the combined storage apparatus 20A and 20B and level the combined support structure 21 of the combined storage apparatus 20A and 20B in the same manner as the storage apparatus 20 in FIGS. 1-6.

Accordingly, in this alternative embodiment of FIGS. 11 and 12A-C, the length of the combined storage apparatus 20A, 20B can be increased along a respective wall 14.

While not shown, in still further embodiments, a pair of storage apparatus 20 can also be installed on separate walls 14 of a structure 10 running transverse, and preferably perpendicular, to one another in substantially the same manner as in FIGS. 8-9, but wherein the second storage apparatus 20 is aligned wherein its second support beam 23B is aligned with a portion of the front support beam 25 and fastened together in a similar manner with fasteners 246 used in fastening the second support beam 23B of the first storage apparatus 20A to the first support beam 23A of the second storage apparatus 20B. One additional cable system 27, or two additional cable systems, coupled to the adjacent second support beam 23B (or to another nonadjacent second support beam 23B) of the first storage apparatus 20A to the first support beam 23A of the second storage apparatus 20B can be used to assist in supporting the combined storage apparatus and leveling of the combined support structure.

Figure 14:
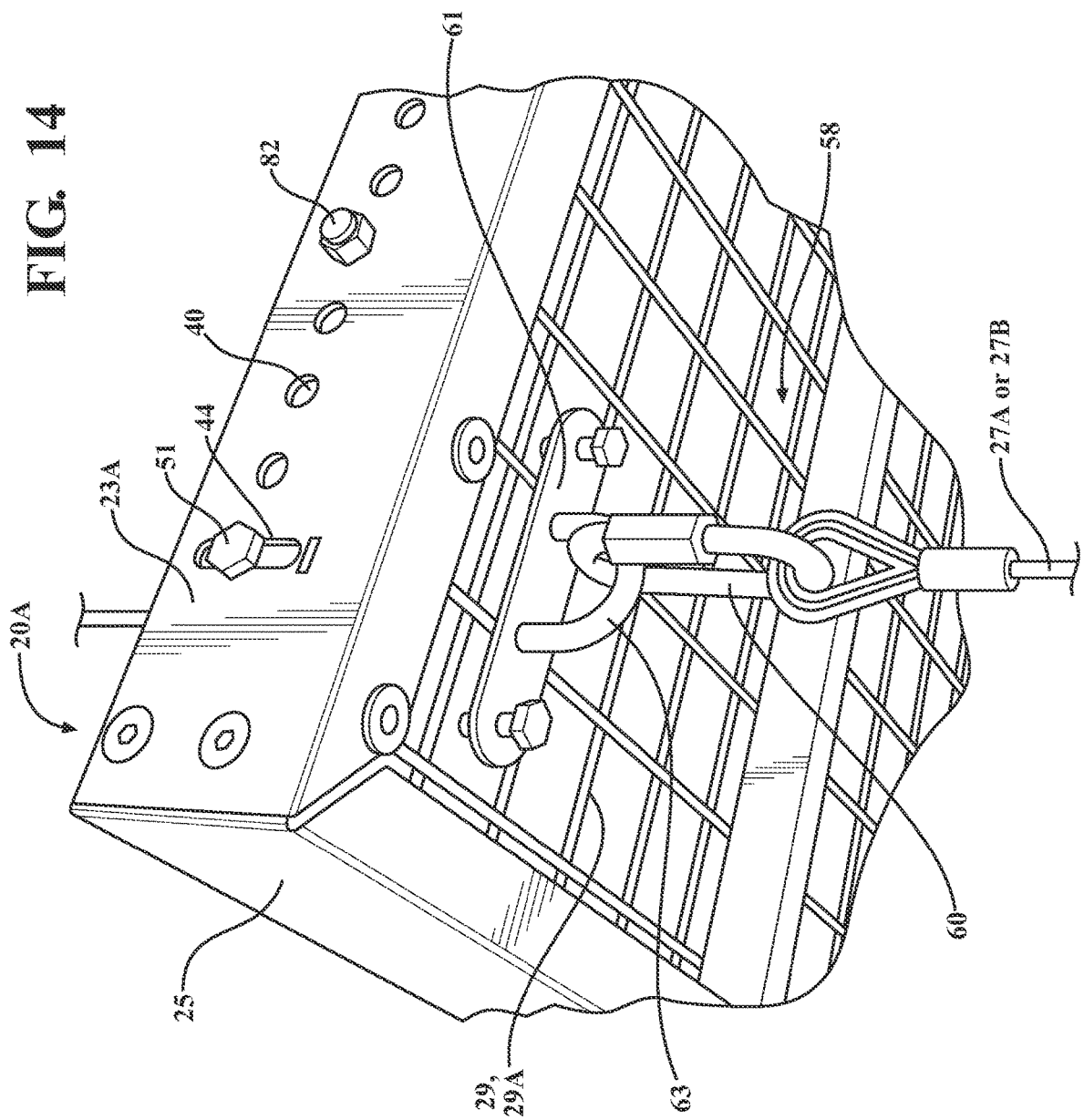
FIG. 14 is a bottom perspective view of FIG. 13 showing the connection of one portion of the second cable system to the top storage apparatus.

In yet another embodiment, and as shown in FIGS. 13-14, a pair of storage apparatus 20 may be vertically arranged with respect to one another with the first storage apparatus 20A positioned above the second storage apparatus 20B. the first storage apparatus 20 is positioned above the second storage apparatus 20B and coupled to the structure 10. The first and second cable systems 27A, 27B of the first storage apparatus 20A may be coupled to the ceiling 16 of the structure, as shown in FIG. 13, or alternatively may be coupled to the wall 14 such as shown in the configuration of FIGS. 1-6. In addition, the first and second cable systems 27A, 27B of the second storage apparatus 20B are coupled to the bottom of the support structure 250, as will be described in FIG. 14 below, as opposed to being coupled to the structure 10. Accordingly, in the embodiment of FIG. 14, the second storage apparatus 20B may be referred to as a dependent storage apparatus 20B. Further details of this embodiment are described below.

The first storage apparatus 20A as illustrated in FIGS. 13-14 has the same configuration as the storage apparatus 20 in FIGS. 1-6 and includes the same individual components as the storage apparatus 20 in FIGS. 1-6. Alternatively, the configuration and/or one or more of the individual components of the first storage apparatus 20A could be different from the first storage apparatus 20 in FIGS. 1-6.

The second storage apparatus 20B as illustrated in FIGS. 13-14 also same configuration as the storage apparatus 20 in FIGS. 1-6 and includes the same individual components as the storage apparatus 20 in FIGS. 1-6. In the configuration of FIGS. 13 and 14, the fastening system 58 of the first cable system 27A of support apparatus 20B is positioned wherein the bracket of support apparatus 20B is secured to the bottom of the first support beam 23A of the first storage device 20A using one or more fastening devices such as screws or nails. Similarly, the fastening system 58 of the second cable system 27B of support apparatus 20B is positioned wherein the bracket of support apparatus 20B is secured to the bottom of the second support beam 23B of the first storage device 20A using one or more fastening devices such as screws or nails. In these embodiments, the combined first and second storage apparatus 20A, 20B may be separately levelled utilizing the pair of alignment devices 48, 92 coupled to the respective first and second support beams 23A, 23B of each of the respective apparatus 20A, 20B in the manner described above in FIGS. 1-6.

Figure 17A:
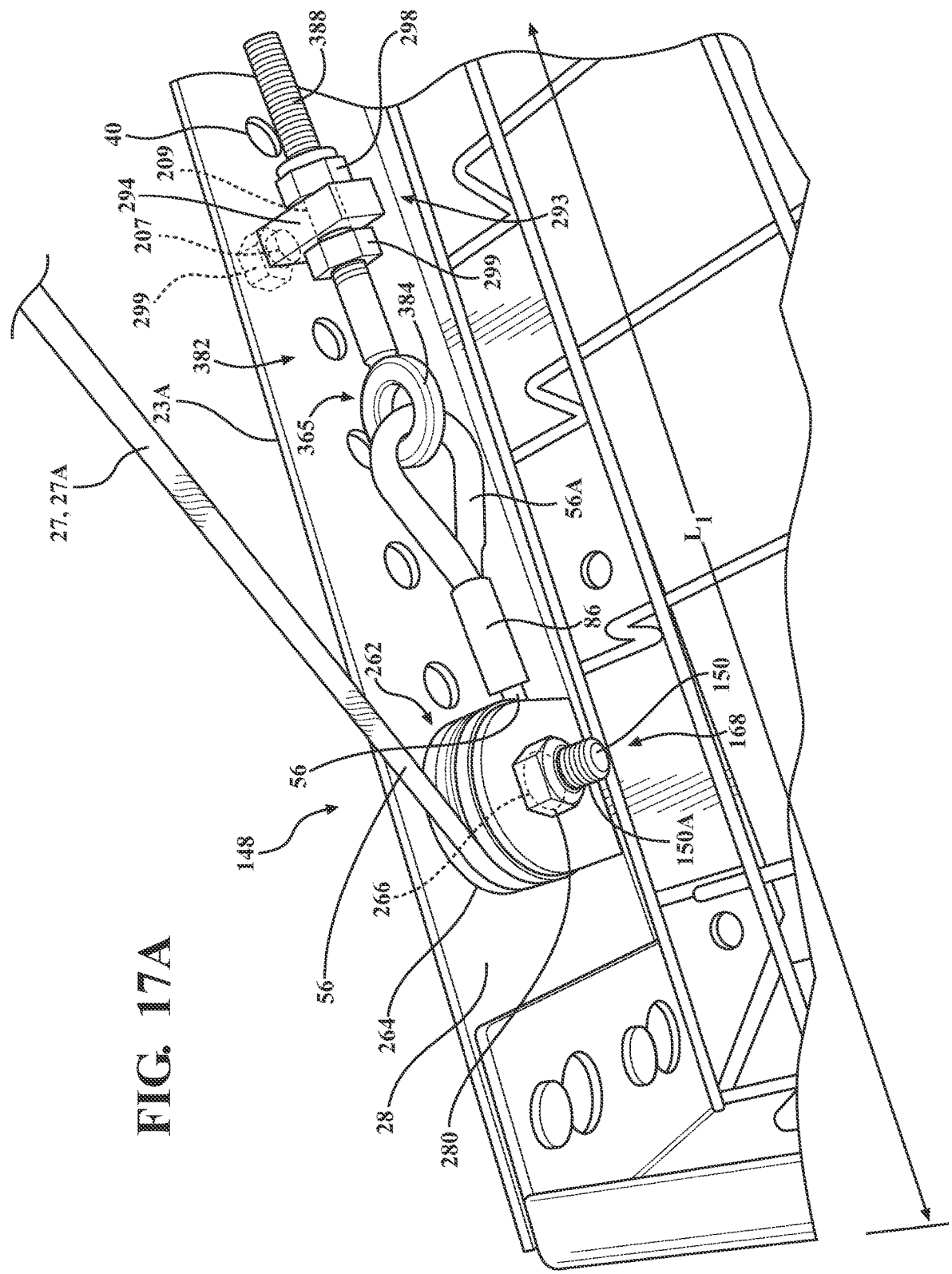
FIG. 17A is a top semi-schematic perspective view of a portion of the support structure of FIG. 15 in accordance with one exemplary alternative embodiment.
Figure 17B:
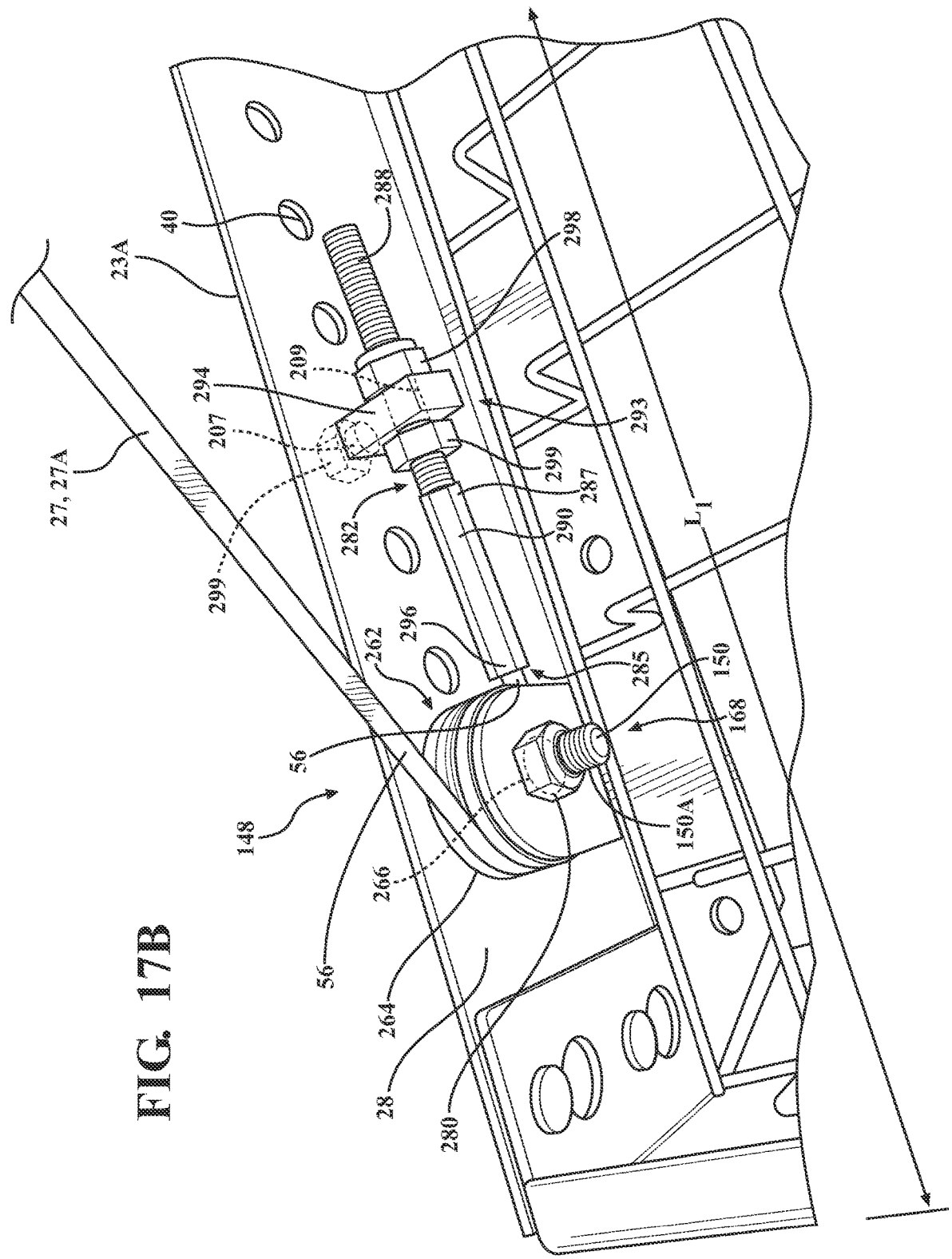
FIG. 17B is a top semi-schematic perspective view of a portion of the support structure of FIG. 15 in accordance with another alternative exemplary embodiment.
Figure 18A:
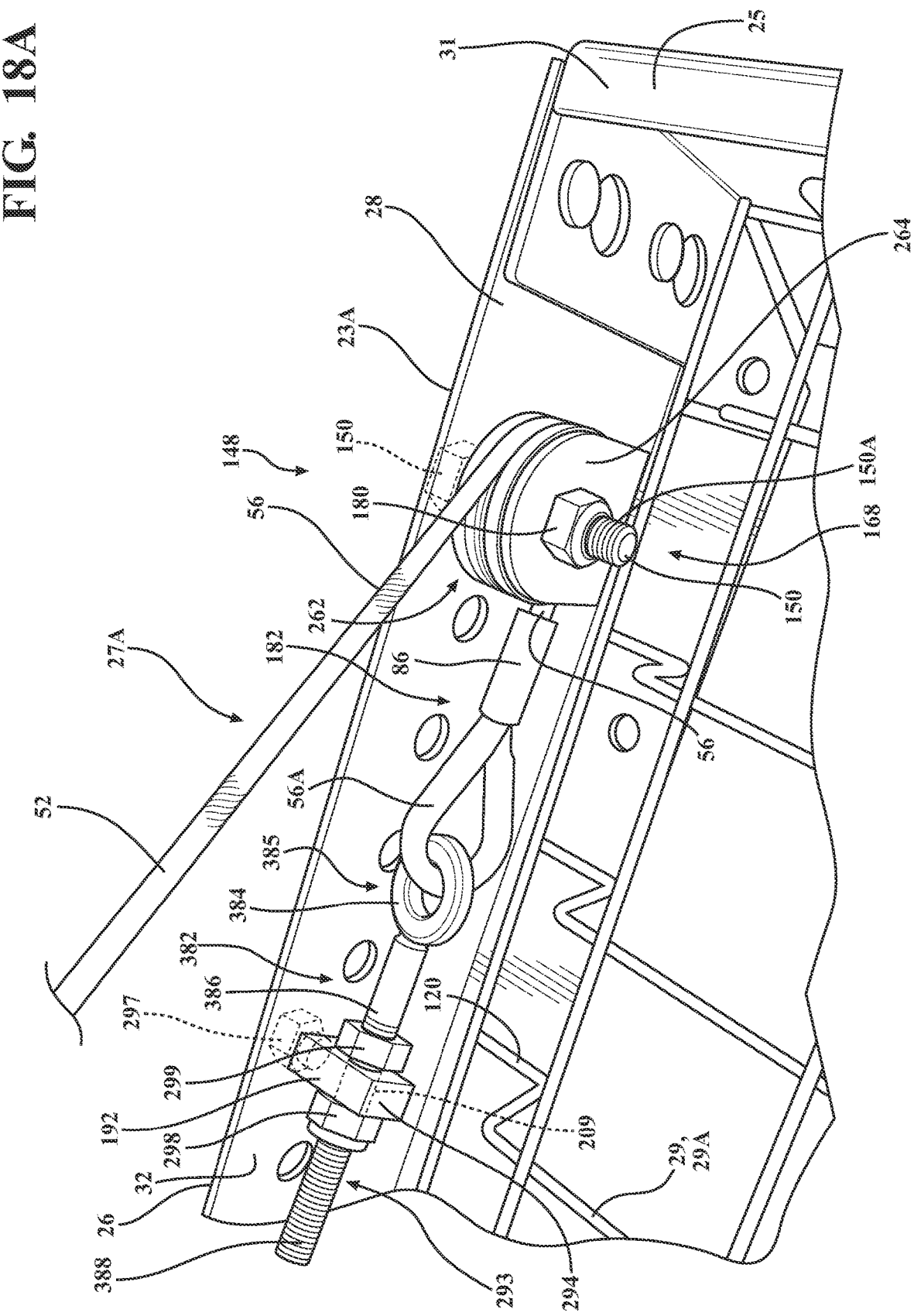
FIG. 18A is another top semi-schematic perspective view of another portion of the support structure of FIG. 15 corresponding to FIG. 17A.
Figure 18B:
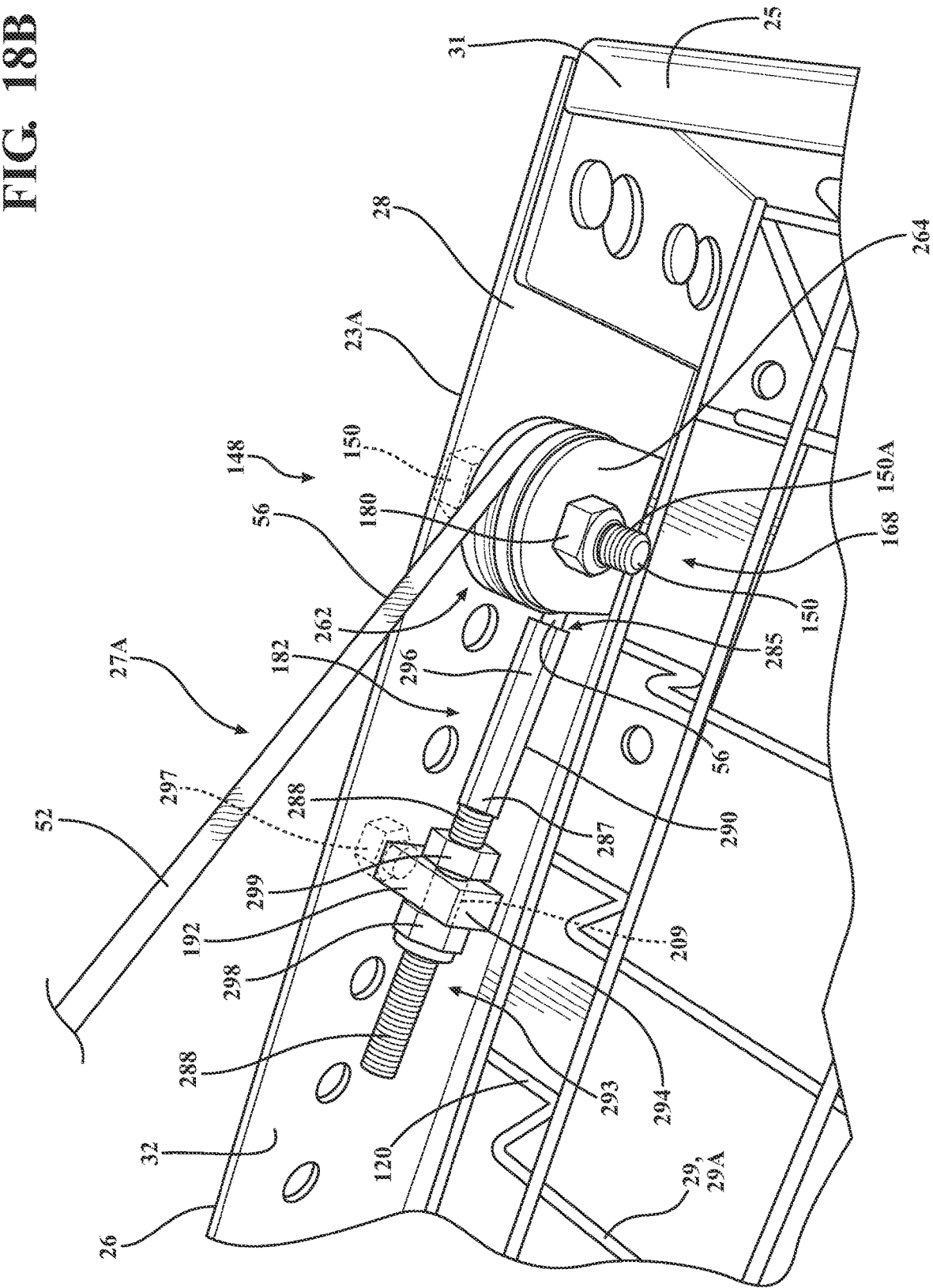
FIG. 18B is another top semi-schematic perspective view of another portion of the support structure of FIG. 15 corresponding to FIG. 17B.
Figure 19:
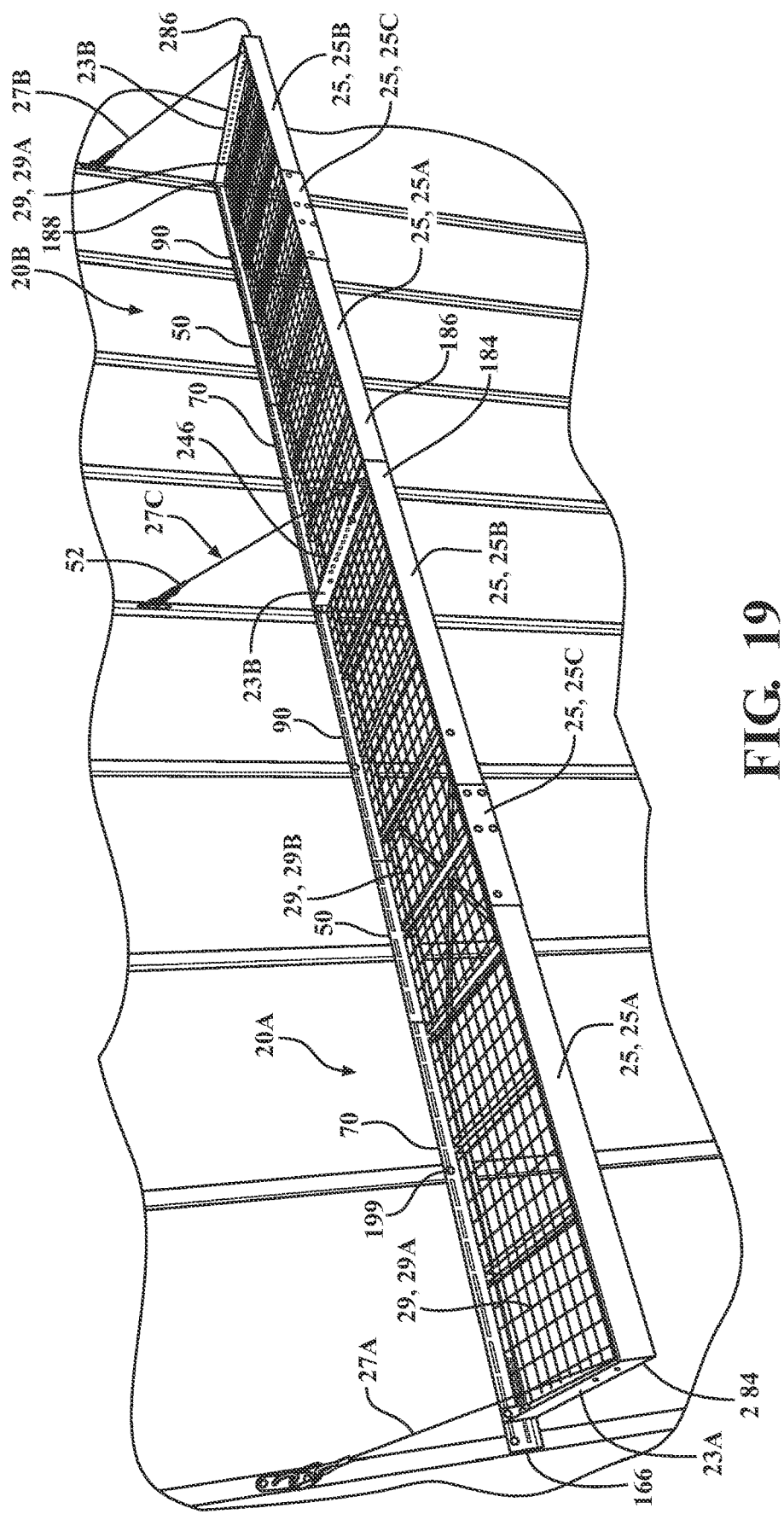
FIG. 19 is a semi-schematic perspective view of an embodiment of a pair of storage apparatus aligned with each other and attached to the wall of the structure illustrated in FIG. 15, FIG. 17A and FIG. 18A.
Figure 20A:
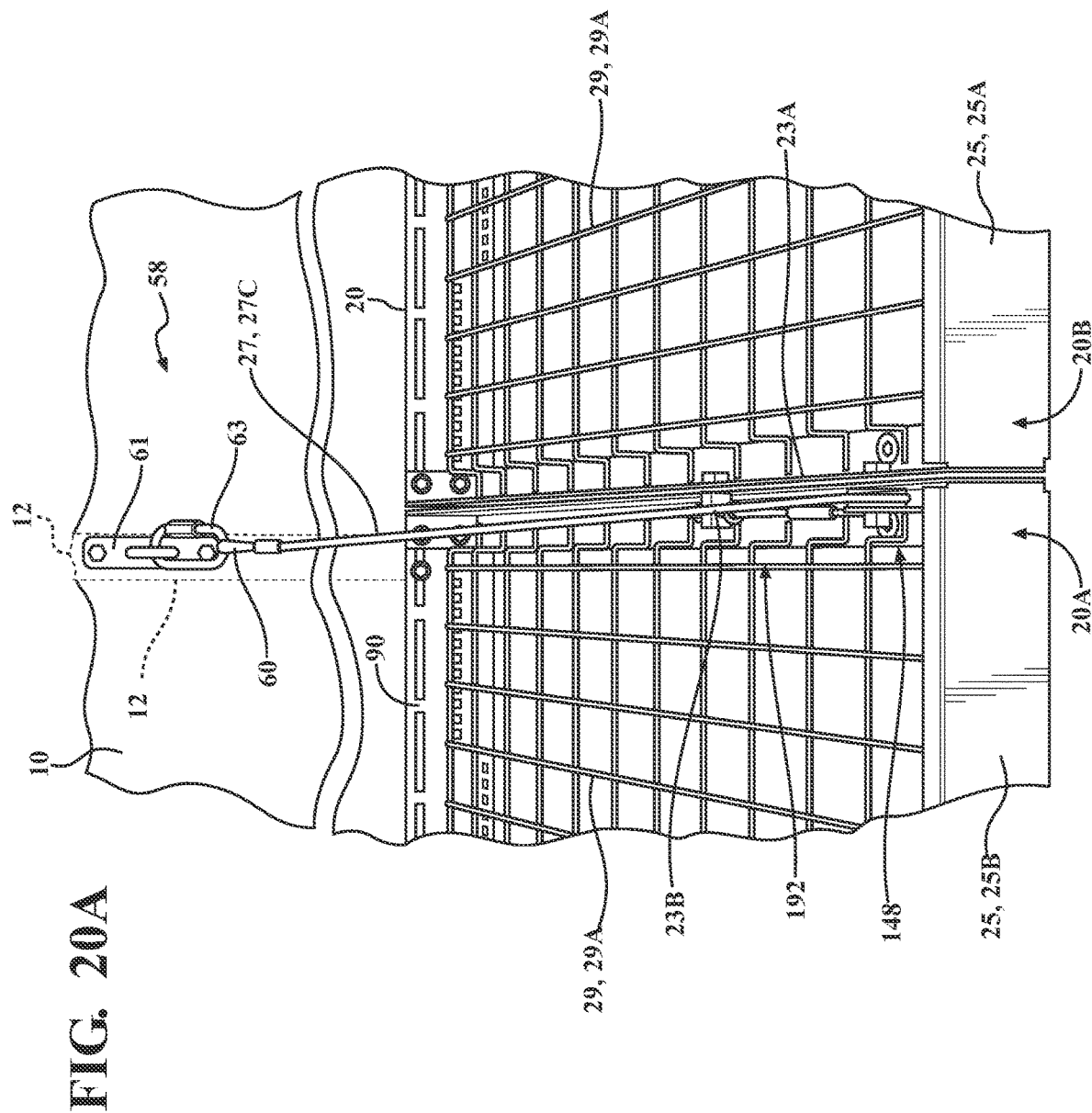
FIG. 20A is a front semi-schematic perspective view of the connection region of the pair of storages apparatus of FIG. 19.
Figure 20B:
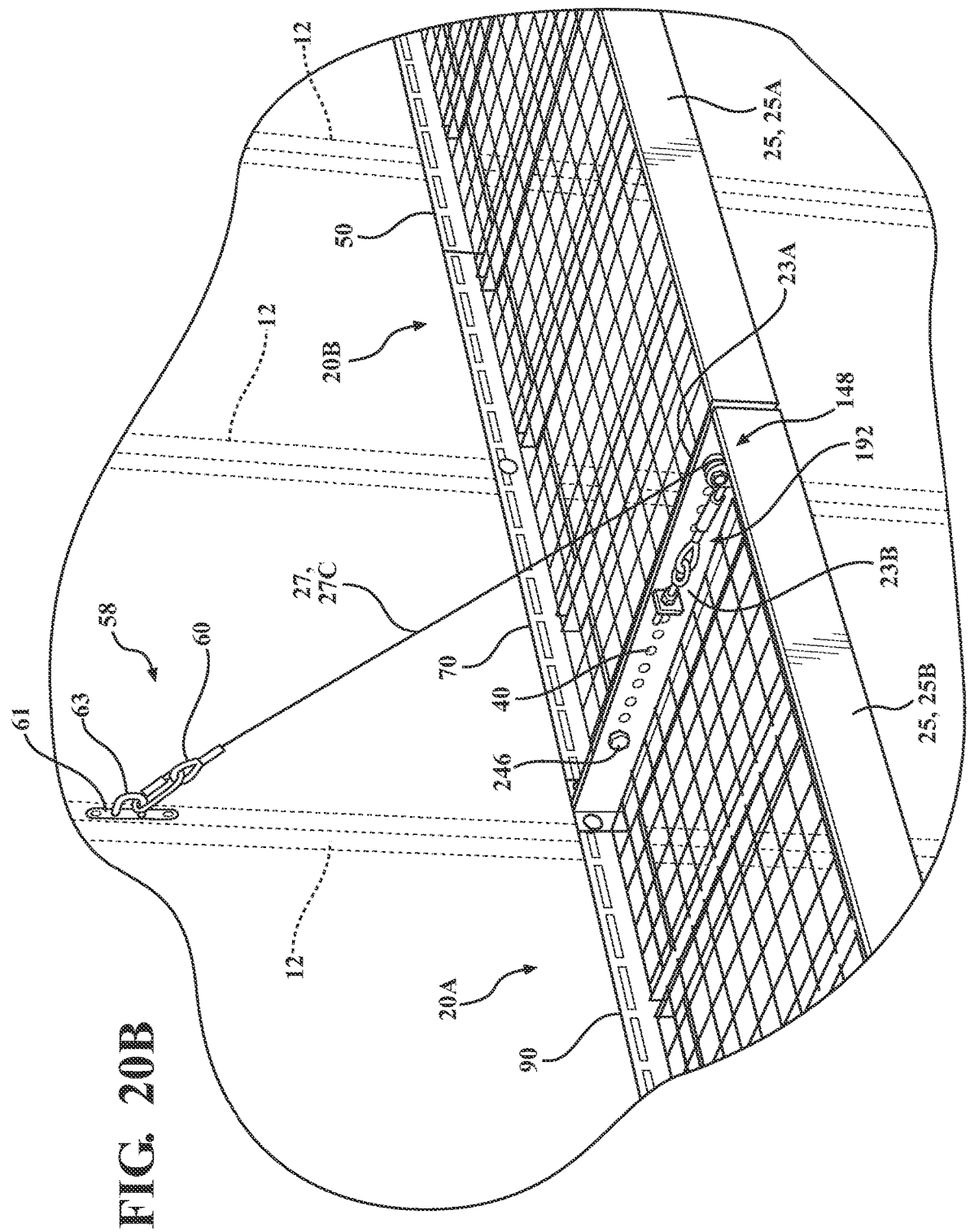
FIG. 20B is a close-up semi-schematic first side perspective view of the connection region in FIG. 20A.

In still further alternative embodiments, as best shown in FIGS. 15-20 and in particular in two alternative embodiments (a first alternative is best shown in FIGS. 17A and 18A, while a second alternative is best shown in FIGS. 17B and 18B), the storage apparatus 20 further includes an alignment device 148 for attaching the second cable end 56 of the cable 52 of the first cable system 27A to the first support beam 23A. Similarly, the storage apparatus 20 further includes an alignment device 148 for attaching the second cable end 56 of the cable 52 of the second cable system 27B to the second support beam 23B. For ease of description below, the description of the alignment device 148 (in accordance with this alternative embodiment) associated with the first support beam 23A is equally applicable to the description of the second cable system 27B and the additional alignment device 48 associated with the second support beam 23B.

The alignment device 148 may be attached anywhere along the length $L_1$ of the first support beam 23A through one of the plurality of apertures 40. In an embodiment, the respective alignment device 148 is attached proximate the second beam end 28 of the first support beam 23A through one of the apertures 40. Additionally, the respective alignment device 148 is disposed adjacent the inner side 32 of the first support beam 23A.

The second cable end 56 is coupled to the alignment device 148 which itself is coupled to the selected one of the first plurality of apertures 40 of the first support beam 23A to align the second cable end 56 with the first support beam 23A and the selected one of the first plurality of apertures 40 of the first support beam 23A.

In each alternative embodiment of FIGS. 15-20, the alignment device 148 includes a pulley 264 with a groove 262 with the cable 52 near the second end 56 seated within the groove 262. The groove 262 can have any suitable configuration and/or take on any suitable form. In the illustrated embodiments, the alignment device 148 includes a pulley 264, and the pulley 264 defines the groove 262. The pulley 264 is fixed to the respective one of the first support beam 23A utilizing a fastening system 168 such that the pulley 264 does not rotate relative to the respective first support beam 23A. In particular, a threaded shaft 150A of a bolt 150 is inserted through the selected one of the first plurality of apertures 40 and through a central aperture 266 of the pulley 264. The fastening system 168 further includes a nut 280 configured to receive and engage the shaft 150A of the bolt 150 to reversibly fix the pulley 264 to the first support beam 23A. The alignment device 148 also includes a secondary mounting bracket 294, described below.

The storage apparatus 20 also includes an incremental adjustment device 293 associated with the first support beam 23A. Similarly, the storage apparatus 20 also includes an additional incremental adjustment device 293 associated with the second support beam 23B. For ease of description, the incremental adjustment device 293 associated with the first support beam 23A is described below but is equally applicable to the description of the additional incremental adjustment device 293 associated with the second support beam 23B.

In addition, the alignment device 148 also includes a secondary mounting bracket 294. The bracket 294 defines an opening (shown in phantom in FIGS. 17A and 17B) as a threaded opening 207), which is aligned with another respective one of the apertures 40 in the first support beam 23A. A bolt 297 (shown in phantom in FIGS. 17A and 18A) is inserted through the aligned aperture 40 and threaded opening 207 to secure the bracket 294 to the first support beam 23A.

The bracket 294 also defines a threaded opening (shown in phantom in FIGS. 17A, 17B, 18A and 18B as 209) extending transverse to the threaded opening 207 configured to receive and threadingly engage to the threaded shaft 388 of a turnbuckle top connector 382 in accordance with the first alternative embodiment of FIGS. 17A and 17B or is configured to receive and threadingly engage the threaded shaft 288 of the stud fastener 282 of the second alternative embodiment (FIGS. 17B and 18B) therethrough.

The incremental adjustment device 293 includes a pair of nuts 298, 299 each positioned on opposing sides of the bracket 294 which are each threadingly engaged to the threaded shaft 288 of the stud fastener 282. Nut 298 is sometimes alternatively referred to as a hex nut 298, while nut 299 may sometimes be alternatively referred to as a lock nut 299.

In the alternative embodiments of FIGS. 15-20 as shown in the first alternative embodiment of FIGS. 17A and 18A, the incremental adjustment device 293 includes the turnbuckle top connector 382 having an eyelet portion 384 extending from a central shaft 386 and includes wherein the second end 56 of the cable 52 includes the looped portion 56A and fitting 86. The eyelet portion 384 defines an opening 385 that receives the looped portion 56A therethrough. The opposing end of the threaded shaft 386 opposite the eyelet portion 384 includes the threaded shaft 388.

In the alternative embodiments of FIGS. 15-20 as shown in the second alternative embodiment of FIGS. 17B and 18B, the incremental adjustment device 293 includes the stud fastener 282 having a first hollow barrel section 285 that receives the second cable end 56 of the cable 52. In particular, after the second cable end 56 is received into a first end 296 of the first hollow barrel section 285, the first end 296 of the stud fastener 282 is crimped to retain the second cable end 56 within the hollow barrel section 285.

The opposing end 287 of the stud fastener 282 includes a threaded shaft 288 extending therefrom. The stud fastener 282 also includes central region 290, preferably a polygonal shaped central region 290, here shown as a hexagonal shaped central region 290 (the hexagonal shape defined in cross section), positioned between the threaded shaft portion 288 and the first end 296. In certain embodiments, such as shown in the FIGS. 13 and 14, the crimped end 296 is also polygonal shaped and is an extension of the central region 290 (i.e., the crimped end 296 is an extension of the central region 290, and vice versa).

As noted above, and in each of the embodiments of FIGS. 15-20 the alignment device 148 also includes a secondary mounting bracket 294. The bracket 294 defines an opening (shown in phantom in FIGS. 17A and 18A as a threaded opening 207), which is aligned with another respective one of the apertures 40 in the first support beam 23A. A bolt 297 (shown in phantom in FIGS. 17A and 18A) is inserted through the aligned aperture 40 and threaded opening 207 to secure the bracket 294 to the first support beam 23A.

The bracket 294 also defines a threaded opening (shown in phantom in FIGS. 17A, 17B, 18A and 18B as 209) extending transverse to the threaded opening 207 configured to receive and threadingly engage the threaded shaft 388 of the turnbuckle top connector 382 (see FIGS. 17A and 18A) or is configured to receive and threadingly engage the threaded shaft 288 of the stud fastener 282 (see FIGS. 17B and 18B) therethrough.

The incremental adjustment device 293 includes a pair of nuts 298, 299 each positioned on opposing sides of the bracket 294 which are each threadingly engaged to the threaded shaft 288 of the stud fastener 282.

The incremental adjustment device 293 of either alternative embodiment allows for the respective first support beam 23A to be levelled horizontally by a user after the storage system 20 is fixed to the wall 14. In particular, a user can utilize a wrench to rotate one the nuts 298, 299 in a first rotational direction or rotate the other of the nuts 298, 299 in a second rotational direction opposite the first rotational direction, while utilizing a second wrench coupled to the other of the nuts 298, 299 to also rotate it in the second direction. The rotation of the nuts 298, 299 in the first rotational direction causes the threaded shaft 388 of the turnbuckle top connector 382 (FIGS. 17A and 18A), or the threaded shaft 288 of the stud fastener 282 (FIGS. 17B and 18B) to incrementally travel through the threaded opening 209 of the bracket 294 in a first direction away from the pulley 264, which causes the cable 52 of the first cable system 27A to be slid along the groove 262 of the pulley 264, thereby increasing the length of the second cable end 56 of the cable 52 of the first cable system 27A between the pulley 264 and the bracket 294 while decreasing the length of the cable 52 between the wall 14 and the pulley 264, which causes the second beam end 28 to be raised relative to the first beam end 26. Conversely, the rotation of the nuts 298, 299 in the second rotational direction causes the threaded shaft 388 of the turnbuckle top connector 382 (FIGS. 17A and 18A), or the threaded shaft 288 of the stud fastener 282 (FIGS. 17B and 18B) to incrementally travel through the threaded opening 209 of the bracket 294 in a second direction toward the pulley 264, which causes the cable 52 of the first cable system 27A to be slid along the groove 262 of the pulley 264, thereby decreasing the length of the second cable end 56 of the cable 52 between the pulley 264 and the bracket 294 while increasing the length of the cable 52 of the first cable system 27A between the wall 14 and the pulley 264, which causes the second beam end 28 to be lowered relative to the first beam end 26. Accordingly, by rotating the nuts 298, 299 in the first or second rotational direction, the length $L_1$ (see FIGS. 17A and 17B) of the first support beam 23A can be easily incrementally adjusted by the user into a horizontal position relative to the floor from a non-horizontal position relative to the floor after installation/affixing of the storage device 20 to the wall 14.

Alternatively, and specific to the embodiment provided in FIGS. 17B and 18B, the user can utilize a wrench to rotate the polygonal shaped central region 290 while maintaining the positioning of the nut 299 or the nut 298 with another wrench. The rotation of the polygonal shaped central region 290 (with the nuts 298, 299 remaining stationary) in the first rotational direction causes the threaded shaft 288 of the stud fastener 282 to incrementally travel through the threaded opening 209 of the bracket 294 in a first direction away from the pulley 264, which causes the cable 52 of the first cable system 27A to be slid along the groove 262 of the pulley 264, thereby increasing the length of the second cable end 56 of the cable 52 of the first cable system 27A between the pulley 264 and the bracket 294 while decreasing the length of the cable 52 between the wall 14 and the pulley 264, which causes the second beam end 28 to be raised relative to the first beam end 26. The rotation of the polygonal shaped central region 290 (with the nuts 298, 299 remaining stationary) in the second rotational direction opposite the first rotational direction causes the threaded shaft 288 of the stud fastener 282 to incrementally travel through the threaded opening 209 of the bracket 294 in a second direction towards the pulley 264, which causes the cable 52 of the first cable system 27A to be slid along the groove 262 of the pulley 264, thereby decreasing the length of the second cable end 56 of the cable 52 of the first cable system 27A between the pulley 264 and the bracket 294 while increasing the length of the cable 52 between the wall 14 and the pulley 264, which causes the second beam end 28 to be lowered relative to the first beam end 26. Accordingly, by rotating the polygonal shaped central region 290 in the first or second rotational direction with the nuts 298, 299 remaining stationary, the length $L_1$ of the first support beam 23A can be easily incrementally adjusted by the user into a horizontal position relative to the floor from a non-horizontal position relative to the floor after installation/affixing of the storage device 20 to the wall 14.

The subject application has been described in an illustrative manner, and it is be understood that the terminology which has been used is intended to be in the nature of words of description rather than of limitation. It is now apparent to those skilled in the art that many modifications and variations of the present subject application are possible in light of the above teachings. It is, therefore, to be understood that the subject application may be practiced otherwise than as specifically described.

What is claimed is:

1. A storage apparatus attachable to a surface, said storage apparatus comprising:
   a mounting bracket for attachment to the surface;
   a plurality of support beams interconnected together and coupled to said mounting bracket to form a support frame with said plurality of support beams including a first support beam having first and second beam ends, and said first support beam defining a plurality of mounting positions between said first and second beam ends;
   a support structure abutting and being at least partially supported by said support frame;
   an alignment device attached to said first support beam through at least one of said plurality of mounting positions;
   a cable extending between a first cable end and a second cable end with said first cable end adapted to be attached to the surface and with said second cable end coupled to said alignment device, said cable movable relative to said alignment device to adjust said support structure and said support frame relative to said mounting bracket; and
   an incremental adjustment device coupled to said cable and having a mount engaging one of the mounting positions of said support beam, and said incremental adjustment device being threaded to further move said cable relative to said alignment device to further adjust said support structure and said support frame relative to said mounting bracket with said incremental adjustment device being positionable to any one of said plurality of mounting positions independent of said threaded adjustment.

2. The storage apparatus of claim 1, wherein said first support beam defines a plurality of openings defining said plurality of mounting positions between said first and second beam ends.

3. The storage apparatus of claim 1 wherein said first support beam includes a ledge with said ledge defining an opening and said adjustment device mounted to said opening.

4. The storage apparatus of claim 1, wherein said first support beam defines a vertical slot with said alignment device is at least partially attached to said support beam through said slot.

5. The storage apparatus of claim 1, wherein said alignment device comprises:
   a mounting bolt received through a first one of said plurality of mounting positions in said first support beam with said cable mounted to said mounting bolt; and
   a pulley with said cable disposed about said pulley.

6. The storage apparatus of claim 5, wherein said incremental adjustment device comprises:
   a bracket coupled to said pulley; and
   a bolt secured to said bracket and said first support beam, wherein the rotation of said bolt in a first rotational direction causes said bracket and said pulley to move in a first direction relative to said first support beam, and wherein the rotation of said bolt in a second rotational direction opposite the first rotational directions causes said bracket and said pulley to move in a second direction opposite said first direction relative to said first support beam.

7. The storage apparatus of claim 6, wherein said first support beam defines a vertical slot with said pulley and said bracket coupled to said support beam through said slot for movement relative to said slot during incremental adjustment.

8. The storage apparatus of claim 7, wherein said bracket includes a base and a pair of spaced apart legs extending transversely from said base, with each of said legs defining an aperture,
   wherein a shaft of an additional bolt of a fastening system is introduced through said vertical slot, through said aperture of a first one of said pair of legs, through said pulley, and through a second one of said pair of legs.

9. The storage apparatus of claim 6, wherein said incremental adjustment device comprises:
   a stud fastener extending between a first end and an opposing second end, said first end having a hollow barrel section receiving and securing said second cable end and said second end having a threaded shaft threadingly engaged with said opening in said secondary bracket with said threaded shaft of said stud fastener extending through said opening;
   a first nut threadingly engaged to said threaded shaft and positioned between said second leg portion and said pulley;
   a second nut threadingly engaged to said threaded shaft and positioned such that said second leg portion is between said first nut and said second nut,
   wherein the rotation of said first nut and said second nut in a first rotational direction relative to said threaded shaft causes said threaded shaft to travel through said opening in said second leg portion in a direction away from said pulley, and
   wherein the rotation of said first nut and said second nut in a second rotational direction opposite said first rotational direction relative to said threaded shaft causes said threaded shaft to travel through said second leg portion in a direction toward from said pulley.

10. The storage apparatus of claim 6, wherein said incremental adjustment device comprises:
   a turnbuckle top connector extending between a first end and an opposing second end, said first end an eyelet portion receiving and holding said second cable end and an opposing end having a threaded shaft threadingly engaged with said opening in said secondary bracket with said threaded shaft of said turnbuckle top connector extending through said opening;
   a first nut threadingly engaged to said threaded shaft and positioned between said second leg portion and said pulley;
   a second nut threadingly engaged to said threaded shaft and positioned such that said second leg portion is between said first nut and said second nut,
   wherein the rotation of said first nut and said second nut in a first rotational direction relative to said threaded shaft causes said threaded shaft to travel through said opening in said second leg portion in a direction away from said pulley, and
   wherein the rotation of said first nut and said second nut in a second rotational direction opposite said first rotational direction relative to said threaded shaft causes said threaded shaft to travel through said second leg portion in a direction toward from said pulley.

11. The storage apparatus of claim 10, wherein said alignment device further includes a bolt introduced through said secondary mounted position and within an opening in said secondary bracket to secure said secondary bracket to said first support beam.

12. The storage apparatus of claim 6, wherein said incremental adjustment device comprises:
   a stud fastener extending between a first end and an opposing second end, said first end having a hollow barrel section receiving and securing said second cable end and said second end having a threaded shaft threadingly engaged with said opening in said secondary bracket with said threaded shaft of said stud fastener extending through said opening;
   a first nut threadingly engaged to said threaded shaft and positioned between said second leg portion and said pulley;
   a second nut threadingly engaged to said threaded shaft and positioned such that said second leg portion is between said first nut and said second nut,
   wherein the rotation of said hollow barrel section in a first rotational direction relative to said threaded shaft while said first and second nut remain stationary causes said threaded shaft to travel through said opening in said second leg portion in a direction away from said pulley, and
   wherein the rotation of said hollow barrel section in a second rotational direction opposite said first rotational direction relative to said threaded shaft while said first and second nut remain stationary causes said threaded shaft to travel through said second leg portion in a direction toward from said pulley.

13. The storage apparatus of claim 12, wherein said alignment device further includes a bolt introduced through said secondary mounted position and within an opening in said secondary bracket to secure said secondary bracket to said first support beam.

14. The storage apparatus of claim 1, wherein said alignment device comprises:
   a pulley including a groove with said second end of said cable positioned within said groove;
   a fastening system for reversibly fixing said pulley to said first one of said plurality of mounting positions; and
   a secondary bracket positioned adjacent to a second mounting position on said support beam, said secondary bracket defining an opening configured to receive said incremental adjustment device.

15. The storage apparatus of claim 1, wherein a length of said mounting bracket defined between a first bracket end and a second bracket end can be changed with said changed length corresponding to a desired bracket position between and including a minimum bracket position and a maximum bracket position such that respective first and second bracket ends of said mounting bracket are aligned with respect to the surface as desired prior to attaching said storage apparatus to the surface.

16. The storage apparatus of claim 15, wherein the surface is part of a structure, the structure defining a wall including a plurality of spaced apart studs, and wherein said desired bracket position is further defined as a position wherein each of said first bracket end and said second bracket end of said mounting bracket are respectively aligned with a corresponding one stud of the plurality of studs prior to attaching said storage apparatus to the surface.

17. The storage apparatus of claim 16, wherein said mounting bracket includes a plurality of slot openings, and wherein one slot opening of said plurality of slot openings at or near each of said first bracket end and said second bracket end are respectively aligned with said corresponding one stud of the plurality of studs in said desired bracket position prior to attaching said storage apparatus to the surface.

18. A storage apparatus attachable to a surface, said storage apparatus comprising:
   a mounting bracket for attachment to the surface, said mounting bracket including:
      a first side rail attachable to the surface and extending between a first bracket end and a second bracket end;
      a second side rail attachable to the surface and extending between a first bracket end and a second bracket end;
      a middle rail attachable to the surface and extending in length between a first bracket end and a second bracket end with said second bracket end of said first side rail slidingly coupled to said first bracket end of said middle rail and with said first bracket end of said second side rail slidingly coupled to said second bracket end of said middle rail;
   a plurality of support beams interconnected together and coupled to said mounting bracket to form a support frame with said plurality of support beams including a first support beam having first and second beam ends;
   a support structure abutting and being at least partially supported by said support frame; and
   a cable extending between a first cable end and a second cable end with said first cable end adapted to be attached to the surface and with said second cable end coupled to said support beam;
   wherein a length of said mounting bracket defined between said first bracket end of said first side rail and said second bracket end of said second side rail can be changed to a desired length by sliding at least one of said second side rail and said first side rail relative to said middle rail with said desired length corresponding to a desired bracket position between and including a minimum bracket position and a maximum bracket position, wherein each of said first side rail, said second side rail, and said middle rail of said mounting bracket includes a plurality of apertures to attach said first side rail to said middle rail and to attach said second side rail to said middle rail, and wherein said mounting bracket includes a plurality of slot openings spaced from said apertures to mount said support frame to said mounting bracket and for attaching the storage apparatus to the surface.

19. The storage apparatus of claim 18, wherein wherein said length of said back bracket assembly defined between said first bracket end of said first side rail and said second bracket end of said second side rail can change by sliding said first side rail relative to said middle rail or by sliding said second side rail relative to said middle rail or by sliding said first side rail relative to said middle rail in combination with sliding said second side rail relative to said middle rail.

20. The storage apparatus of claim 18, wherein the storage apparatus further includes a first fastener configured to be received through said one slot opening at or near said first bracket end of said first side rail for securing said first side rail to the surface, and wherein the storage apparatus further includes a second fastener configured to be received through said one slot opening at or near said second bracket end of said second side rail for securing said second side rail to the surface.

21. The storage apparatus of claim 18 further comprising an alignment device attached to the first support beam through at least one of said plurality of mounting positions.

22. The storage apparatus of claim 18 further comprising:

an alignment device attached to the first support beam through at least one of said plurality of mounting positions; and an incremental adjustment device coupled to one of said alignment device and said cable to further move said cable relative to said alignment device to further adjust said support structure relative to said mounting bracket.

23. A storage apparatus attachable to a surface, said storage apparatus comprising:

a mounting bracket for attachment to the surface;

a plurality of support beams interconnected together and coupled to said mounting bracket to form a support frame with said plurality of support beams including a first support beam having first and second beam ends, and said first support beam defining a plurality of mounting positions between said first and second beam ends and defining a vertical slot;

a support structure abutting and being at least partially supported by said support frame;

an alignment device attached to said first support beam through at least one of said plurality of mounting positions, said alignment device comprising:

a mounting bolt received through a first one of said plurality of mounting positions in said first support beam, and a pulley;

a cable extending between a first cable end and a second cable end with said first cable end adapted to be attached to the surface and with said second cable end mounted to said mounting bolt of said alignment device and with said cable disposed about said pulley, said cable movable relative to said alignment device to adjust said support structure and said support frame relative to said mounting bracket; and an incremental adjustment device coupled to said cable, said incremental adjustment device comprising:

a bracket coupled to said pulley, said bracket including:

a base and a pair of spaced apart legs extending transversely from said base, with each of said legs defining an aperture, a bolt secured to said base of said bracket and said first support beam, wherein a shaft of an additional bolt of a fastening system is introduced through said vertical slot, through said aperture of a first one of said pair of legs, through said pulley, and through a second one of said pair of legs, and wherein the rotation of said bolt in a first rotational direction causes said bracket and said pulley to move in a first direction relative to said first support beam, and wherein the rotation of said bolt in a second rotational direction opposite the first rotational direction causes said bracket and said pulley to move in a second direction opposite said first direction relative to said first support beam.

* * * * *